US008953445B2

(12) United States Patent
Prodan et al.

(10) Patent No.: US 8,953,445 B2
(45) Date of Patent: Feb. 10, 2015

(54) HIERARCHICAL FLOW-LEVEL MULTI-CHANNEL COMMUNICATION

(71) Applicant: Broadcom Corporation, Irvine, CA (US)

(72) Inventors: Richard S. Prodan, Boulder, CO (US);
Joel Danzig, Alpharetta, GA (US);
Thomas J. Quigley, Franklin, NC (US);
Niki R. Pantelias, Duluth, GA (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 14/027,995

(22) Filed: Sep. 16, 2013

(65) Prior Publication Data

US 2014/0016636 A1 Jan. 16, 2014

Related U.S. Application Data

(63) Continuation of application No. 12/847,839, filed on Jul. 30, 2010, now Pat. No. 8,537,680, which is a continuation of application No. 11/261,652, filed on Oct. 31, 2005, now Pat. No. 7,792,034.

(60) Provisional application No. 60/622,937, filed on Oct. 29, 2004.

(51) Int. Cl.
*H04J 1/16* (2006.01)
*H04J 3/16* (2006.01)

(52) U.S. Cl.
USPC ............................. 370/230; 370/252; 370/465

(58) Field of Classification Search
None
See application file for complete search history.

(56) References Cited

U.S. PATENT DOCUMENTS

| | | | |
|---|---|---|---|
| 5,815,488 A | 9/1998 | Williams et al. |
| 5,867,485 A | 2/1999 | Chambers et al. |
| 6,272,127 B1 | 8/2001 | Golden et al. |
| 6,516,192 B1 | 2/2003 | Spaur et al. |
| 6,563,831 B1 | 5/2003 | Dally et al. |
| 6,741,575 B1 | 5/2004 | Zhang et al. |
| 6,763,025 B2 | 7/2004 | Leatherbury et al. |
| 6,834,057 B1 | 12/2004 | Rabenko et al. |
| 6,898,182 B1 | 5/2005 | Cloonan |
| 6,917,591 B2 | 7/2005 | St. John |
| 7,023,871 B2 | 4/2006 | Lind et al. |
| 7,047,553 B1 | 5/2006 | Cloonan et al. |

(Continued)

FOREIGN PATENT DOCUMENTS

CN 1504034 A 6/2004

OTHER PUBLICATIONS

Tse, D.N.C. et al., "*Statistical Multilexing of Multiple Time-Scale Markov Streams*," IEEE Journal on Selected Areas in Communication 13(6): 1028-1038, IEEE (Aug. 1995).

(Continued)

*Primary Examiner* — Andrew Lee
(74) *Attorney, Agent, or Firm* — Sterne, Kessler, Goldstein & Fox P.L.L.C.

(57) ABSTRACT

Embodiments herein provide systems and methods of transferring data in a communication system. An embodiment transfers data by assigning a portion of data among groups of channels coupled to a remote node, such assigning being based on the respective flows to which the portion is associated. The portion of data across is at least two channels in the assigned group of channels, and the split portions are transferred substantially simultaneously among the channels to which they are assigned.

20 Claims, 28 Drawing Sheets

(56) References Cited

U.S. PATENT DOCUMENTS

| | | |
|---|---|---|
| 7,113,484 B1 | 9/2006 | Chapman et al. |
| 7,194,009 B2 | 3/2007 | Eng |
| 7,209,442 B1 | 4/2007 | Chapman |
| 7,412,212 B2 | 8/2008 | Hottinen |
| 7,450,579 B2 | 11/2008 | Howard et al. |
| 7,792,034 B2 | 9/2010 | Prodan et al. |
| 8,130,642 B2 | 3/2012 | Howard et al. |
| 8,537,680 B2 | 9/2013 | Prodan et al. |
| 2002/0106029 A1 | 8/2002 | Bunn et al. |
| 2002/0131425 A1 | 9/2002 | Shalom |
| 2002/0132629 A1 | 9/2002 | Desai et al. |
| 2002/0191542 A1 | 12/2002 | Gerard Pauwels et al. |
| 2003/0039230 A1* | 2/2003 | Ostman et al. ......... 370/335 |
| 2003/0058890 A1 | 3/2003 | Ritchie, Jr. et al. |
| 2003/0206554 A1 | 11/2003 | Dillon |
| 2003/0236080 A1 | 12/2003 | Kadous et al. |
| 2004/0066743 A1 | 4/2004 | Shimojo et al. |
| 2004/0133925 A1 | 7/2004 | Franceschini et al. |
| 2004/0163129 A1 | 8/2004 | Chapman et al. |
| 2004/0218623 A1 | 11/2004 | Goldenberg et al. |
| 2005/0002334 A1 | 1/2005 | Chao et al. |
| 2005/0052992 A1 | 3/2005 | Cloonan et al. |
| 2005/0111376 A1* | 5/2005 | Raghothaman et al. ...... 370/252 |
| 2005/0135419 A1 | 6/2005 | Pullen et al. |
| 2005/0198685 A1 | 9/2005 | Walston |
| 2005/0245197 A1 | 11/2005 | Kadous et al. |
| 2006/0117363 A1 | 6/2006 | Lee et al. |
| 2006/0182139 A1 | 8/2006 | Bugajski et al. |
| 2006/0256772 A1 | 11/2006 | Yarlagadda |
| 2007/0047956 A1* | 3/2007 | Shimizu et al. ......... 398/49 |
| 2007/0098007 A1 | 5/2007 | Prodan et al. |
| 2007/0116152 A1 | 5/2007 | Thesling |
| 2009/0232077 A1* | 9/2009 | Krieger et al. ......... 370/329 |

OTHER PUBLICATIONS

Lee, C.C. and Bertorelle, J., "*System-level Capacity and QoS in DOCSIS1.1 Upstream*," paper presented at Society of Cable Telecommunication Engineers (SCTE) Emergining Technology Conference, 2002, 27 pages.

International Search Report dated Sep. 11, 2006, issued in International Application No. PCT/US05/39105.

English Abstract for Chinese Patent Publication No. CN 1504034A, published Jun. 9, 2004, 1 page, from espacenet.com.

Non-Final Office Action mailed May 20, 2010, in U.S. Appl. No. 12/258,585, Howard, D., et al., filed Oct. 27, 2008.

Non-Final Office Action mailed Dec. 1, 2010, in U.S. Appl. No. 12/258,585, Howard, D., et al., filed Oct. 27, 2008.

Final Office Action mailed Apr. 1, 2011, in U.S. Appl. No. 12/258,585, Howard, D., et al., filed Oct. 27, 2008.

Notice of Allowance mailed Oct. 31, 2011, in U.S. Appl. No. 12/258,585, Howard, D., et al., filed Oct. 27, 2008.

Supplemental Notice of Allowance mailed Nov. 4, 2011, in U.S. Appl. No. 12/258,585, Howard, D., et al., filed Oct. 27, 2008.

Extended European Search Report directed toward related EP Application No. 05 82 5041.6, European Patent Office, Rijswijk, Netherlands, dated Apr. 15, 2013; 5 pages.

Motorola, "Motorola SmartStream Encryptor Modulator," retrieved from the Internet at http://broadband.motorola.com/catalog/product_documents/SEM_wp_july03.pdf [retrieved on Sep. 26, 2011]; 10 pages.

* cited by examiner

HIERARCHICAL FLOW-LEVEL MULTI-CHANNEL COMMUNICATION

CROSS-REFERENCE TO RELATED APPLICATIONS

This application is a continuation to U.S. patent application Ser. No. 12/847,839, filed Jul. 30, 2010, which will issue as U.S. Pat. No. 8,537,680 on Sep. 17, 2013, which is a continuation of U.S. patent application Ser. No. 11/261,652, filed Oct. 31, 2005, now U.S. Pat. No. 7,792,034, which claims benefit to U.S. Provisional Application No. 60/622,937, filed Oct. 29, 2004, all of the which are incorporated herein by reference in its entirety.

BACKGROUND OF THE INVENTION

1. Field of the Invention

The present invention relates generally to communication systems, and more specifically, to managing communication over multiple channels in a communication system.

2. Related Art

The present invention addresses issues relating to communication systems, and specifically point-to-multipoint communication systems. In conventional point-to-multipoint communication systems, a network supports bidirectional data communication between a central entity and multiple customer premises equipment (CPE). Example point-to-multipoint communication systems include cable modem systems, fixed wireless systems, and satellite communication systems. In each system, the communication path from the central entity to the CPE is typically referred to as the downstream, while the communication path from the CPE to the central entity is typically referred to as the upstream.

One type of point-to-multipoint system is a cable modem system, which typically includes a headend that is capable of communicating with multiple CPE, each of which provides cable modem functionality. In a cable modem system, the CPE may be a cable modem, a settop box, or a cable gateway, to provide some examples. The upstream of the cable modem system may consist of multiple channels that can be assigned to the multiple CPE. These channels are separated from each other by operating at different frequencies. However, the downstream traditionally consists of a single broadcast channel.

DOCSIS™ (Data Over Cable Service Interface Specification) refers to a group of specifications published by CableLabs® that define industry standards for cable headend and cable modem equipment. In part, DOCSIS™ sets forth requirements and objectives for various aspects of cable modem systems including operations support systems, management, data interfaces, as well as network layer, data link layer, and physical layer transport for data over cable systems. The current version of the DOCSIS™ specification is version 2.0, and includes the DOCSIS™ Radio Frequency Interface (RFI) Specification SP-RFIv2.0-I03-021218 (hereinafter "DOCSIS™ RFI Specification"), the entirety of which is incorporated by reference herein.

DOCSIS™ supports the ITU-T J.83 B (hereinafter "Annex B") standard for downstream physical (PHY) layer transmissions from the headend to cable modems. Advances in communication technology are requiring increasingly more bandwidth, which may lead to deficiencies in channel capacity, especially with respect to these downstream transmissions. For example, even cable plants operating at a frequency of 750 MHz are being challenged with capacity shortages, due to increased demand for video on demand (VOD), high-definition television (HDTV), digital services, and expanding analog channel lineups. Numerous schemes have been proposed to help alleviate the downstream bandwidth issues, including analog spectrum reclamation and advanced video coding techniques.

What is needed is a method, system, and/or computer program product that addresses one or more of the aforementioned shortcomings of conventional communication systems and methods.

SUMMARY OF THE INVENTION

A communication system includes a supervisory node (e.g., a headend) and one or more remote nodes (e.g., cable modems). Packets are transmitted between the supervisory node and the one or more remote nodes via RF channels. A plurality of the RF channels are bonded, such that packets may be transmitted via any one or more of the RF channels that are bonded.

Bonding may include higher-layer bonding and/or lower-layer bonding. In higher-layer bonding, the communication system further includes a forwarder and a plurality of modulators, such as edge quadrature amplitude modulators (edge QAMs) or edge orthogonal frequency division modulators (edge OFDMs). Each modulator is connected to a different RF channel or group thereof. According to a first embodiment, the forwarder determines to which modulator a packet or a plurality of packets is to be transmitted. In a second embodiment, the forwarder determines to which modulator a flow or a plurality of flows is to be transmitted.

In lower-layer bonding, a modulator determines which of the RF channels that are connected to the modulator are to be used to transmit a packet or plurality of packets to a remote node. According to an embodiment, the modulator determines for each packet of a flow that is assigned to the modulator which RF channel is to be used for transmitting the packet.

BRIEF DESCRIPTION OF THE DRAWINGS/FIGURES

The accompanying drawings, which are incorporated herein and form part of the specification, illustrate embodiments of the present invention and, together with the description, further serve to explain the principles of the invention and to enable a person skilled in the pertinent art(s) to make and use the invention. In the drawings, like reference numbers indicate identical or functionally similar elements. Additionally, the leftmost digit(s) of a reference number identifies the drawing in which the reference number first appears.

DETAILED DESCRIPTION OF THE INVENTION

Although the embodiments of the invention described herein refer specifically, and by way of example, to cable modem systems, including cable modem termination systems and cable modems, it will be readily apparent to persons skilled in the relevant art(s) that the invention is equally applicable to other communication systems, including but not limited to satellite systems, optical communications systems, telephone wire systems, and/or any combination thereof. It will also be readily apparent to persons skilled in the relevant art(s) that the invention is applicable to any point-to-multipoint system.

1.0 Overview

Figure 1:
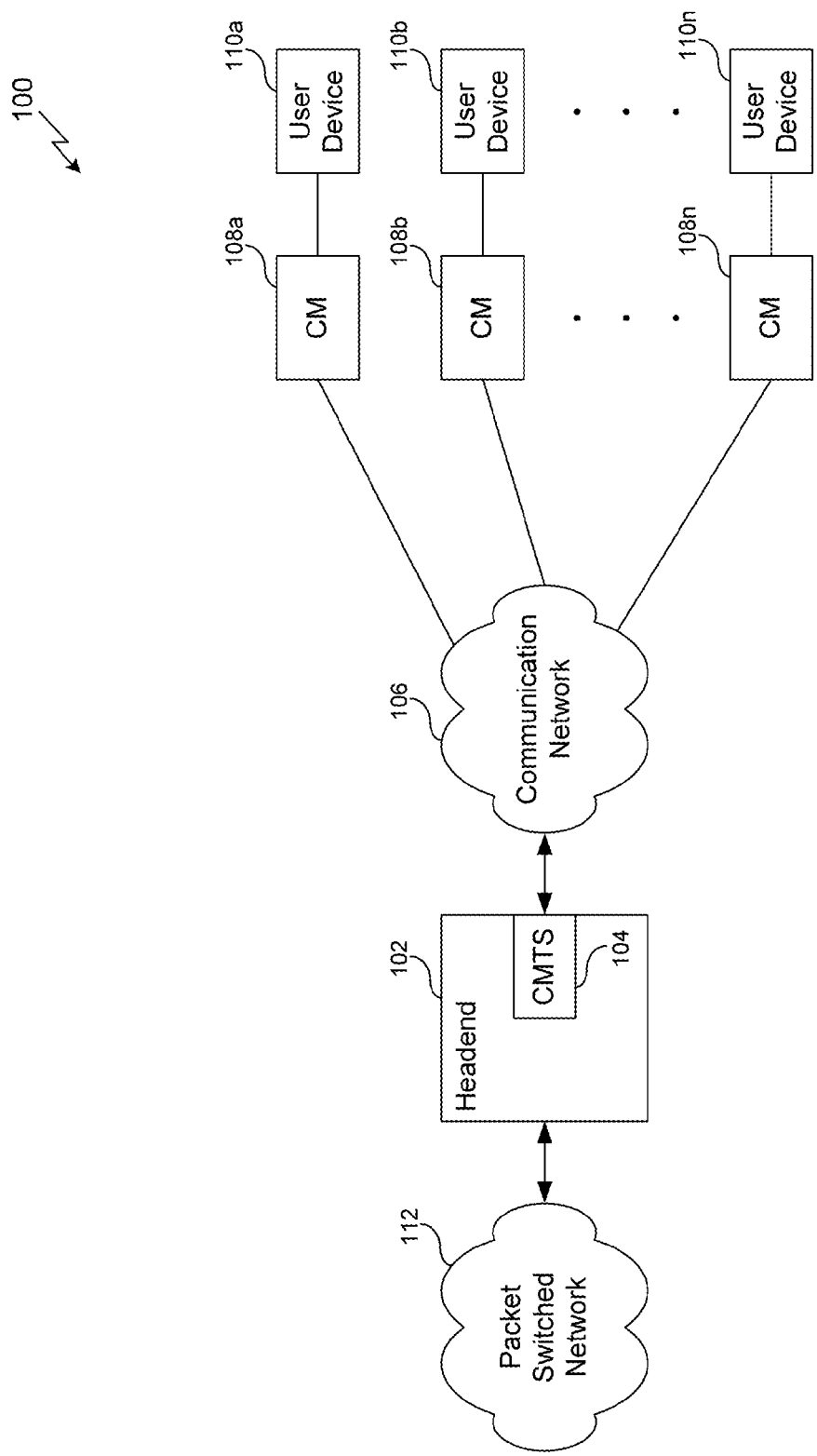
FIG. 1 illustrates a high-level block diagram of an example communication system according to an embodiment of the present invention.

FIG. 1 illustrates a high-level block diagram of an example communication system 100 according to an embodiment of the present invention. The communication system 100 enables voice communications, audio communications, data services, video, messaging, graphics, other forms of media and/or multimedia, or any combination thereof, based on a bi-directional transfer of packet-based traffic, such as Internet Protocol (IP) traffic.

Referring to FIG. 1, the bi-directional transfer of packet-based traffic occurs between a cable system headend 102 and a plurality of cable modems 108a-108n via a communication network 106, which, by way of example, may comprise a hybrid fiber coaxial (HFC) network. Communication network 106 may support wired, wireless, or both transmission media, including satellite, terrestrial (e.g., fiber optic, copper, twisted pair, coaxial, or the like), radio, microwave, free-space optics, and/or any other form or method of transmission. In an embodiment, the communication network 106 includes frequency translation devices in support of a frequency stacking architecture.

The cable headend 102 generally includes at least one cable modem termination system (CMTS) 104. The CMTS 104 is a portion of the cable headend 102 that manages the upstream and downstream transfer of data between the cable headend 102 and the cable modems 108a-108n, each of which may be located at respective customer premises. The CMTS 104 broadcasts information downstream to the cable modems 108a-108n as a continuous transmitted signal in accordance with a time division multiplexing (TDM) technique. The downstream signal may be formatted with a motion picture expert group (MPEG) transmission convergence sublayer, though the present invention is not limited in this respect. For instance, embodiments of the present invention may be configured to support other data formats as would be apparent to one skilled in the relevant art(s).

Additionally, the CMTS 104 receives data from the cable modems 108a-108n over a plurality of shared upstream channels. Data from the cable modems 108a-108n is transmitted upstream in accordance with a time domain multiple access (TDMA) technique or a synchronous code division multiple access (S-CDMA) technique.

CMTS 104 establishes the upstream slot structure and allocates upstream bandwidth by sending, for example, an upstream channel descriptor (UCD) message and MAP messages, respectively, to cable modems 108a-108n. CMTS 104 also uses the MAP messages and slot count values to anticipate burst arrivals from cable modems 108a-108n. In an embodiment, the UCD and MAP messages are defined by the DOCSIS™ specification, originated by CableLabs®, which specifies the interface requirements for cable communication systems.

According to an embodiment, CMTS 104 connects to up to four adjacent, six mega-Hertz (MHz) carriers, each of which taken individually is a completely DOCSIS™ 2.0-compliant downstream. Carriers connected to CMTS 104 need not necessarily be adjacent. It should be understood that the quantity of carriers and the carrier specifications may vary as determined by the system architect. For example, a plurality of eight MHz carriers may be connected to CMTS 104 to conform with European standards.

As shown in FIG. 1, the CMTS 104 further serves as an interface between the communication network 106 and a packet switched network 112, transferring packets received from the cable modems 108a-108n to the packet switched network 112 and transferring packets received from the packet switched network 112 to the cable modems 108a-108n when appropriate.

Packet switched network 112 is part of a wired, wireless, or combination of wired and wireless local area networks (LANs), wide area networks (WANs), and/or optical networks (e.g., an organization's intranet, local internets, the global-based Internet (including the World Wide Web (WWW)), virtual private networks, and/or the like). CMTS 104 utilizes packet switched network 112 to communicate with another device or application external to communication system 100. The device or application may be a server, web browser, operating system, other types of information processing software (e.g., word processing, spreadsheets, financial management, or the like), television or radio transmitter, another cable modem 108, another CMTS 104, or the like.

In addition to the CMTS 104, the cable headend 102 may include one or more routers to facilitate the connection between the CMTS 104 and the packet switched network 112, as well as one or more servers for performing necessary network management tasks. The headend 102 may also include one or more satellite receivers, video modulators, and/or telephone switches, to provide other examples.

Each of the cable modems 108a-108n operates as an interface between the communication network 106 and a corresponding attached user device 110a-110n. In particular, each cable modem 108a-108n converts downstream signals received over the communication network 106 into IP data packets to be received by a corresponding attached user device 110a-110n. Cable modems 108a-108n are configurable to transport one or more services to user devices 110a-110n. The services may include but are not limited to telephony, television broadcasts, pay-for-view, Internet communications (e.g., WWW), radio broadcasts, facsimile, file data transfer, electronic mailing services (email), messaging, video conferencing, live or time-delayed media feeds (such as, speeches, debates, presentations, infomercials, news reports, sporting events, concerts, etc.), and/or the like.

Additionally, each cable modem 108a-108n converts IP or other suitable protocols (e.g., asynchronous transfer mode (ATM)) for packetized data received from a corresponding user device 110a-110n into upstream burst signals suitable for transfer over the communication network 106. The upstream is divided into one or more upstream channels. Each upstream channel carries bursts of packets from cable modems 108a-108n to CMTS 108. In the upstream, each channel is broken into multiple assignable slots, and cable modems 108a-108n send a burst signal in an assigned slot. As discussed above, the slot structure is defined and assigned by CMTS 104.

Referring to FIG. 1, each cable modem 108a-108n is shown supporting only a single user device for the sake of clarity. However, each cable modem 108a-108n is generally capable of supporting a plurality of user devices for communication over the communication system 100. A user device may be a personal computer, data terminal equipment, telephony device, broadband media player, network controlled appliance, or any other device capable of transmitting or receiving data over a packet switched network.

According to an embodiment, CMTS 104 and cable modems 108a-108n are integrated to support protocols such as Internet Protocol (IP), Transmission Control Protocol (TCP), User Datagram Protocol (UDP), Real Time Transport Protocol (RTP), Resource Reservation Protocol (RSVP), or the like.

In an embodiment, cable modems 108a-108n and CMTS 104 represent DOCSIS™-compliant cable modem equipment. In other words, cable modems 108a-108n and CMTS 104 are adapted to communicate in accordance with protocols and/or formats provided in the DOCSIS™ specification.

The communication system 100 may provide downstream synchronous multichannel (DSSM) communications with and among the CMTS 104 and the cable modems 108a-108n. Devices or equipment having the capability to support DSSM communications are referred to herein as being "DSSM-capable." Devices or equipment lacking the capability to support DSSM communications are referred to herein as being "non-DSSM-capable." Non-DSSM devices or equipment include, for example, "legacy cable modems." As such, the present invention may fully integrate the operation and/or management of legacy and DSSM-capable devices, both having the ability to communicate within the same communication system.

Figure 2:
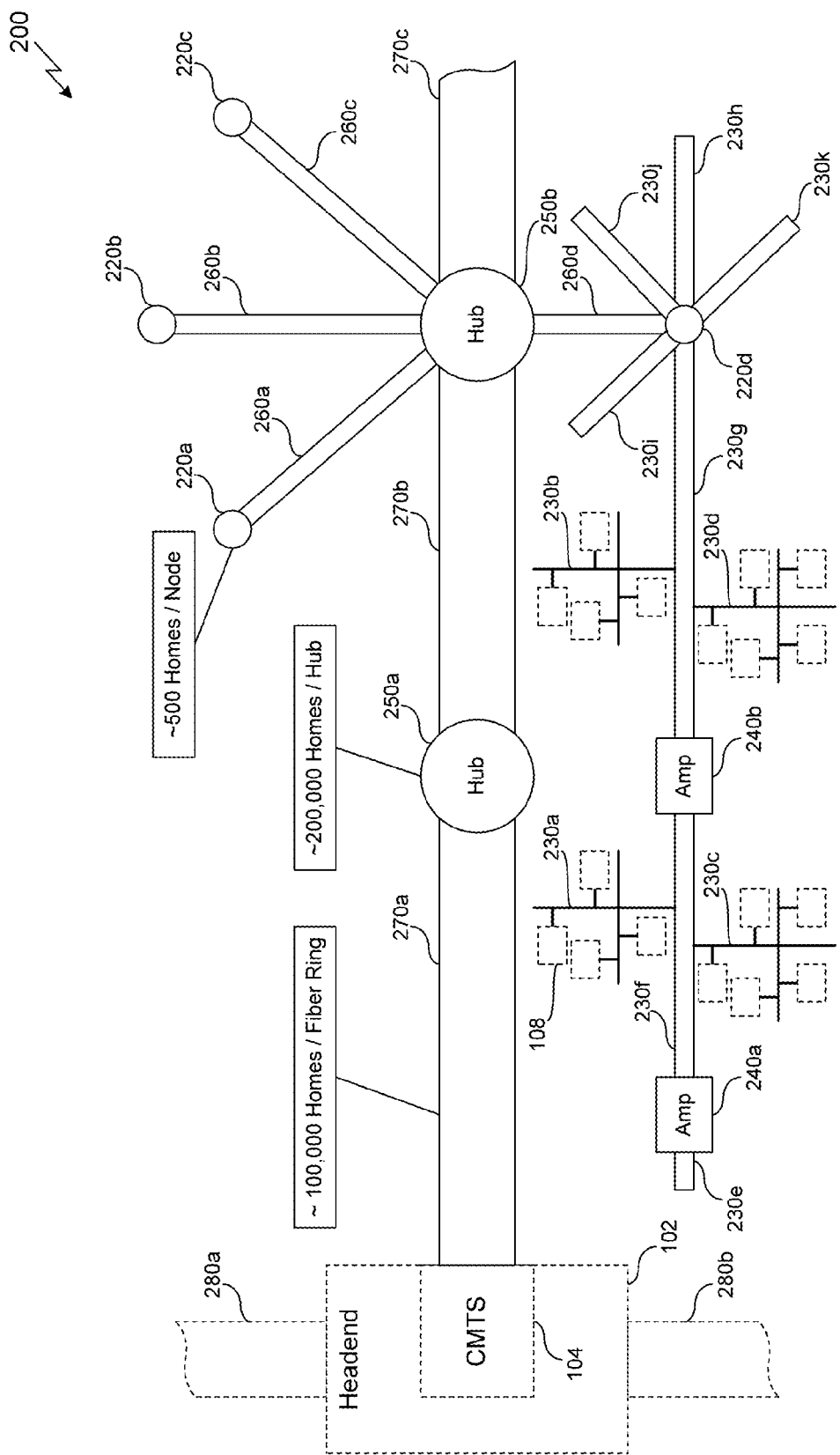
FIG. 2 illustrates a schematic diagram of an example hybrid fiber coaxial (HFC) network showing pathways for data transmissions between a headend and a plurality of cable modems according to an embodiment of the present invention.

FIG. 2 illustrates a schematic diagram of an example hybrid fiber coaxial (HFC) network 200 to facilitate transmission of data between headend 102 and cable modems 108a-108n according to an embodiment of the present invention. For example, the communication network 106 is often used by a cable provider to provide Internet access, cable television, and/or pay-per-view programming to subscribers.

In FIG. 2, approximately 500 cable modems 108 are in electrical communication with each node 220 of the communication network 106 for illustrative purposes. In the embodiment of FIG. 2, cable modems 108 are connected to a node 220 via coaxial cables 230. The communication network 106 includes amplifiers 240 to facilitate the electrical connection of the more distant cable modems 108, for example, to the nodes 220. Amplifying the electrical signals may desirably enhance the signal-to-noise ratio (SNR) of communications between the headend 102 and the cable modems 108. Coaxial cables 230a-230d electrically connect the cable modems 108 with coaxial cables 230f, 230g, which extend between amplifiers 240 and nodes 220.

Each node 220 is electrically connected to a hub 250, typically via an optical fiber 260. The hubs 250 are in communication with the headend 102 via optical fibers 270. Each hub 250 is generally capable of facilitating communication with 20,000 cable modems 108.

The optical fibers 270 extending intermediate the headend 102 and each hub 250 define a fiber ring, which is typically capable of facilitating communication between approximately 100,000 cable modems 108 and the headend 102. The headend 102 may communicate via transmission line 280 with the Internet, another headend, and/or any other suitable device(s) or network. The transmission line 280 may be a T1 line or a T2 line, to provide some examples.

Figure 3:
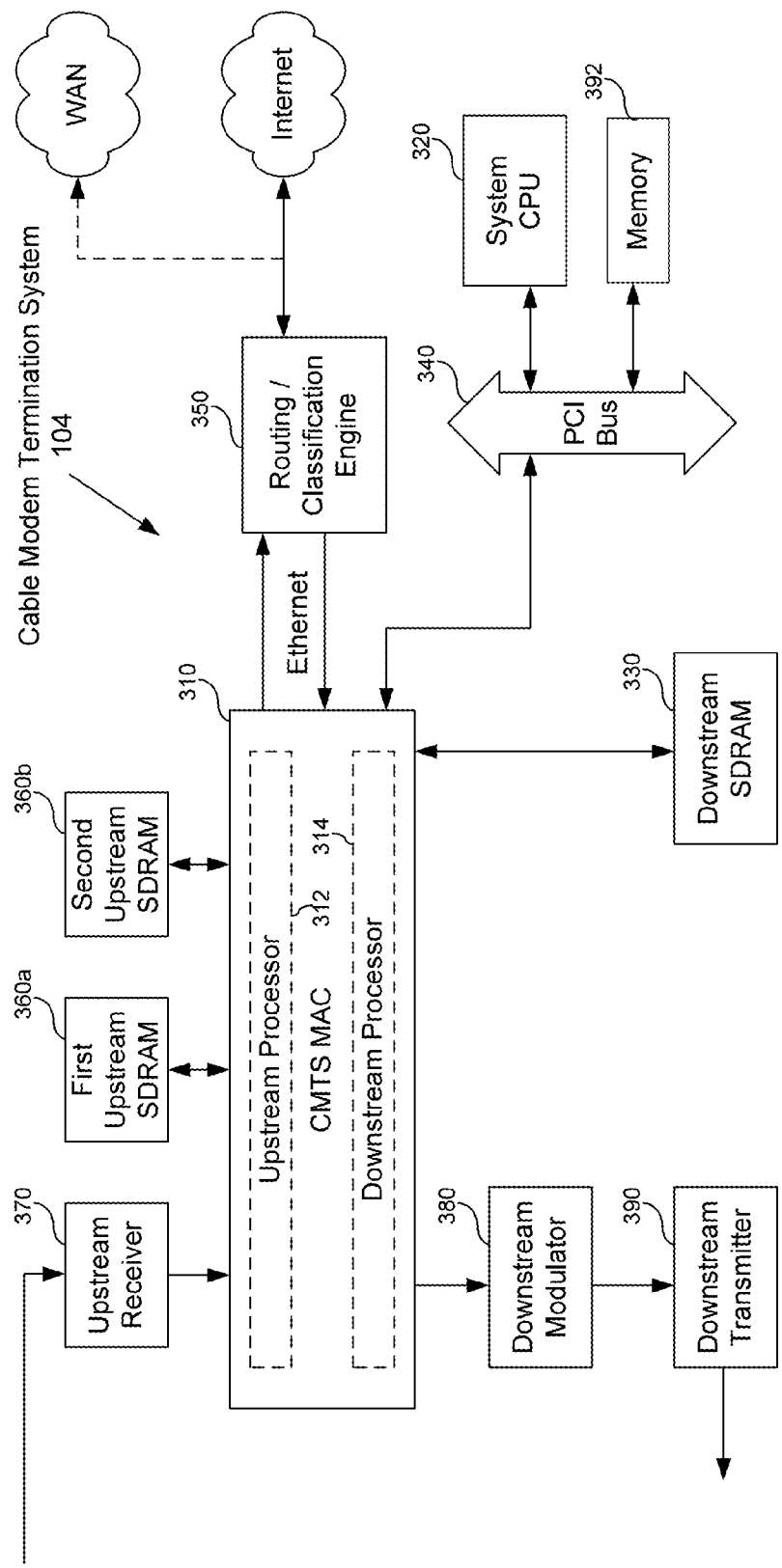
FIG. 3 illustrates a block diagram of an example cable modem termination system (CMTS) according to an embodiment of the present invention.

FIG. 3 illustrates a block diagram of an exemplary implementation of CMTS 104 of communication system 100. This exemplary implementation is presented by way of example, and is not intended to limit the scope of the present invention. The CMTS 104 processes signals both at a physical (PHY) layer and at a media access control (MAC) layer. The CMTS 104 includes a CMTS MAC 310, which provides hardware support for MAC layer per-packet functions, such as fragmentation, concatenation, payload header suppression/expansion, and/or error checking Providing such support reduces the amount of processing required of a system central processing unit (CPU) 320, which serves to improve the overall performance of the CMTS 104.

An upstream processor 312 of the CMTS MAC 310 performs data encryption standard (DES) decryption, fragment reassembly, de-concatenation, payload packet expansion, packet acceleration, upstream management information base (MIB) statistic gathering, and/or priority queuing for the resultant packets. Each output queue is independently configured to provide packets to a peripheral component interconnect (PCI) or a gigabit media independent interface (GMII) (not shown).

A downstream processor 314 of the CMTS MAC 310 accepts packets from priority queues and performs payload header suppression, DOCSIS™ header creation, DES encryption, cyclic redundancy checking (CRC), header check sequence creation in accordance with the DOCSIS™ specification, Moving Pictures Experts Group (MPEG) encapsulation, and/or multiplexing. In an embodiment, a downstream synchronous dynamic random access memory SDRAM 330 is used to support packaging, handling, and storage of output queues received from the CMTS MAC 310.

A memory 392 may interact with CMTS MAC 310 to store signals as they are processed by CMTS MAC 310. Memory 392 may also store various auxiliary data used to support processing activities of the CMTS MAC 310. Such auxiliary data may include but is not limited to security protocols, identifiers, rules, policies, or the like, as described in greater detail below.

According to an embodiment, memory 392 stores a software application to operate on one or more processors or hardware assist devices, such as a field-programmable gate array (FPGA) or an application-specific integrated circuit (ASIC). For instance, the one or more processors may use the software application to process control messages, voice, and/or data received from CMTS MAC 310. In an embodiment, the software application includes a classifier/router and a bandwidth (BW) allocation controller. The BW allocation controller manages upstream and/or downstream modulation and bandwidth allocation. The classifier/router provides rules and policies for classifying and/or prioritizing communications with cable modems 108. The classifier/router also routes signals from cable modems 108 to a destined location over packet switched network 112.

In an embodiment, the CMTS MAC 310 is configured and managed externally via a PCI interface (not shown) and a PCI bus 340. Alternatively, the CMTS MAC 310 may be operated remotely using a routing/classification engine 350 that is located externally to the CMTS MAC 310.

According to an embodiment, first and second upstream SDRAMs 360 are used to minimize latency on the internal buses of CMTS 104. For example, in an embodiment, the first upstream SDRAM 360a is operable to support keys and reassembly, and the second upstream SDRAM 360b is operable to support packet header suppression (PHS) and output queues.

A Serial Peripheral Interface (SPI) master port (not shown) is employed to control the interface between MAC layer components and PHY layer components. For example, the SPI master port may be used to control the interface between the CMTS MAC 310 and the upstream receiver 370 and/or between the CMTS MAC 310 and downstream modulator 380.

The CMTS MAC 310 generates data which is modulated and then transmitted to one or more cable modems 108. For example, data generated by CMTS MAC 310 is modulated onto a carrier signal by downstream modulator 380 and then transmitted downstream by downstream transmitter 390. The upstream receiver 370 receives information from the cable modems 108 in bursts of TDMA- or S-CDMA-encoded packets.

Figure 4:
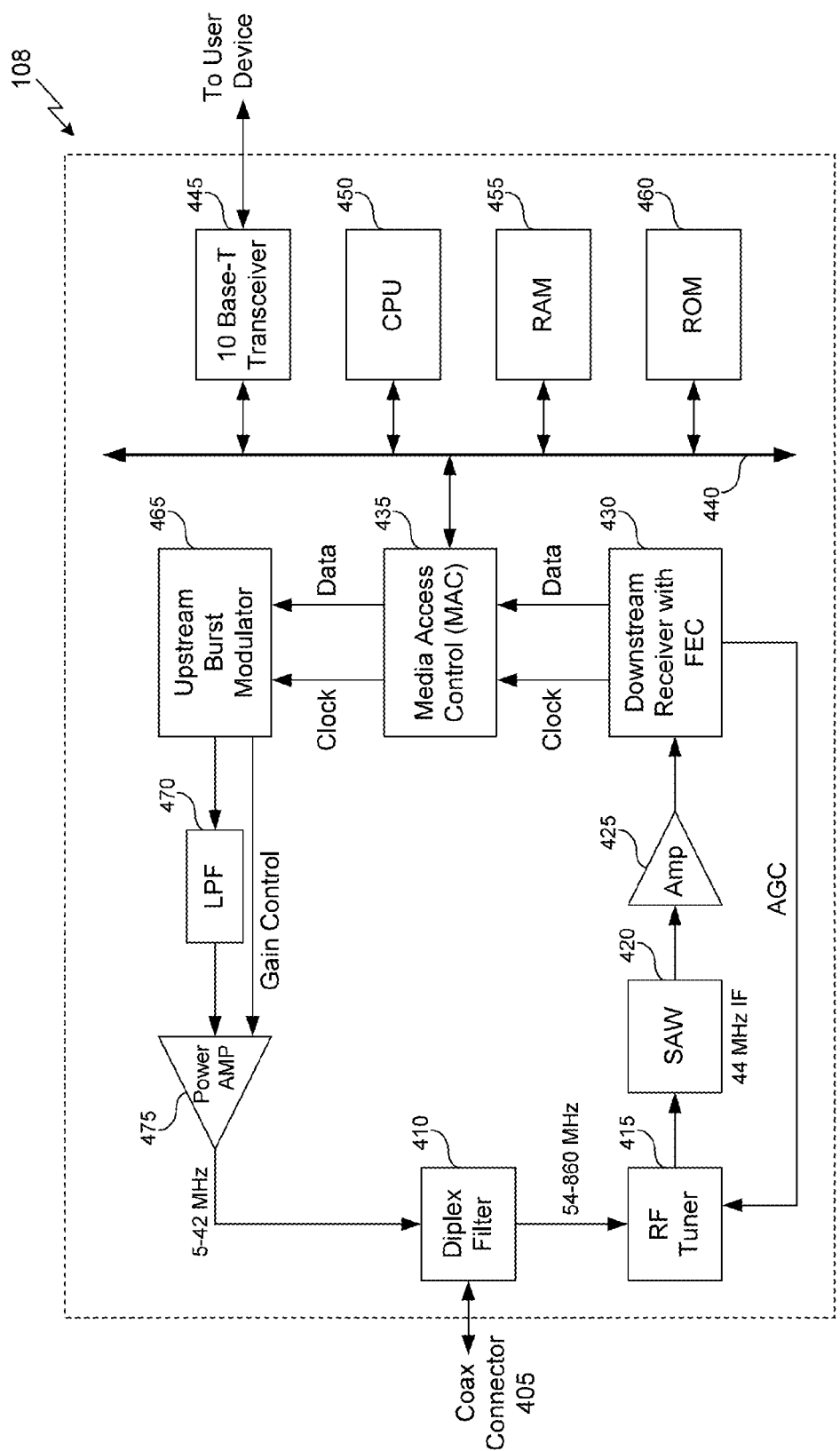
FIG. 4 illustrates a schematic block diagram of an implementation of a cable modem according to an embodiment of the present invention.

FIG. 4 illustrates a schematic block diagram of an exemplary implementation of a cable modem 108 of communication system 100. This exemplary implementation is presented by way of example, and is not intended to limit the present invention. The cable modem 108 is configured to receive and transmit signals to and from the communication network 106 via coaxial connector 405. Accordingly, the cable modem 108 will be described in terms of a receiver portion and a transmitter portion.

The receiver portion includes a diplex filter 410, a radio frequency (RF) tuner 415, a surface acoustic wave (SAW) filter 420, an amplifier 425, and a downstream receiver 430. Reception begins with the diplex filter 410 receiving a downstream signal originating from the CMTS 104. The diplex filter isolates the downstream signal and routes the signal to the RF tuner 415. In an embodiment, the downstream signal has spectral characteristics in the frequency range of approximately 54-860 MHz. The RF tuner 415 downconverts the signal and provides the downconverted signal to the SAW filter 420, which passes only spectral components of the downconverted signal that are within a particular bandwidth. The amplifier 425 amplifies the filtered signal and passes it to the downstream receiver 430. According to an embodiment, automatic gain controls are provided from the downstream receiver 430 to the RF tuner 415.

The downstream receiver 430 demodulates the amplified signal. For example, the downstream receiver 430 may demodulate the amplified signal in accordance with a quadrature amplitude modulation (QAM) technique, such as 64-QAM or 256-QAM, to recover the underlying information signal. The downstream receiver 430 also converts the underlying information signal from an analog form to digital form. The downstream receiver 430 then provides the digitized underlying information to a media access control (MAC) 435.

The MAC 435 processes the digital data, which may include, for example, Ethernet packets for transfer to an attached user device. The functions of the MAC 435 are implemented in hardware, software, firmware, or a combination thereof. In the example implementation of FIG. 4, the functions of the MAC 435 are implemented in both hardware and software. The random access memory (RAM) 455 and/or the read-only memory (ROM) 460 stores software functions of the MAC 435. The CPU 450 executes the software functions of the MAC 435. The MAC 435 is in electrical communication with the CPU 450, the RAM 455, and the ROM 460 via a shared communications medium 440. The shared communications medium may include a computer bus or a multiple access data network, to provide some examples.

Referring to FIG. 4, the MAC 435 is further in electrical communication with an Ethernet interface 445 via the shared communications medium 440. When appropriate, the MAC 435 transfers Ethernet packets received from the downstream receiver 430 to the Ethernet interface 445 for transfer to an attached user device.

The transmitter portion of the cable modem 108 includes an upstream burst modulator 465, a low pass filter 470, a power amplifier 475, and the diplex filter 410. Transmission begins with the MAC 435 receiving a data packet. According to an embodiment, the data packet includes data originally received from an attached user device via the Ethernet interface 445. In another embodiment, the MAC 435 generates the data packet as part of the cable modem network management and upkeep. The MAC 435 formats the data packet in compliance with the protocols set forth in the DOCSIS™ specification. The MAC 435 provides the data packet to the upstream burst modulator 465, which converts the data packet into analog form and modulates the data packet onto a carrier signal in accordance with a particular modulation technique. The modulation technique may include, without limitation, a Quadrature Phase Shift Key (QPSK) technique, an 8-QAM technique, a 16-QAM technique, a 32-QAM technique, or a 64-QAM technique, to provide some examples.

The upstream burst modulator 465 provides the modulated carrier signal to the low pass filter (LPF) 470, which generally passes signals with spectral characteristics in a desired bandwidth within the frequency range of approximately 5-42 MHz. The power amplifier 475 amplifies the filtered signal received from the LPF 470 and provides the amplified signal to the diplex filter 410. The upstream burst modulator 465 typically regulates the gain of the power amplifier 475. The diplex filter 410 isolates the amplified signal and transmits the amplified signal upstream over the communication network 106 during a scheduled burst opportunity.

2.0 Downstream Multichannels

Figure 25:
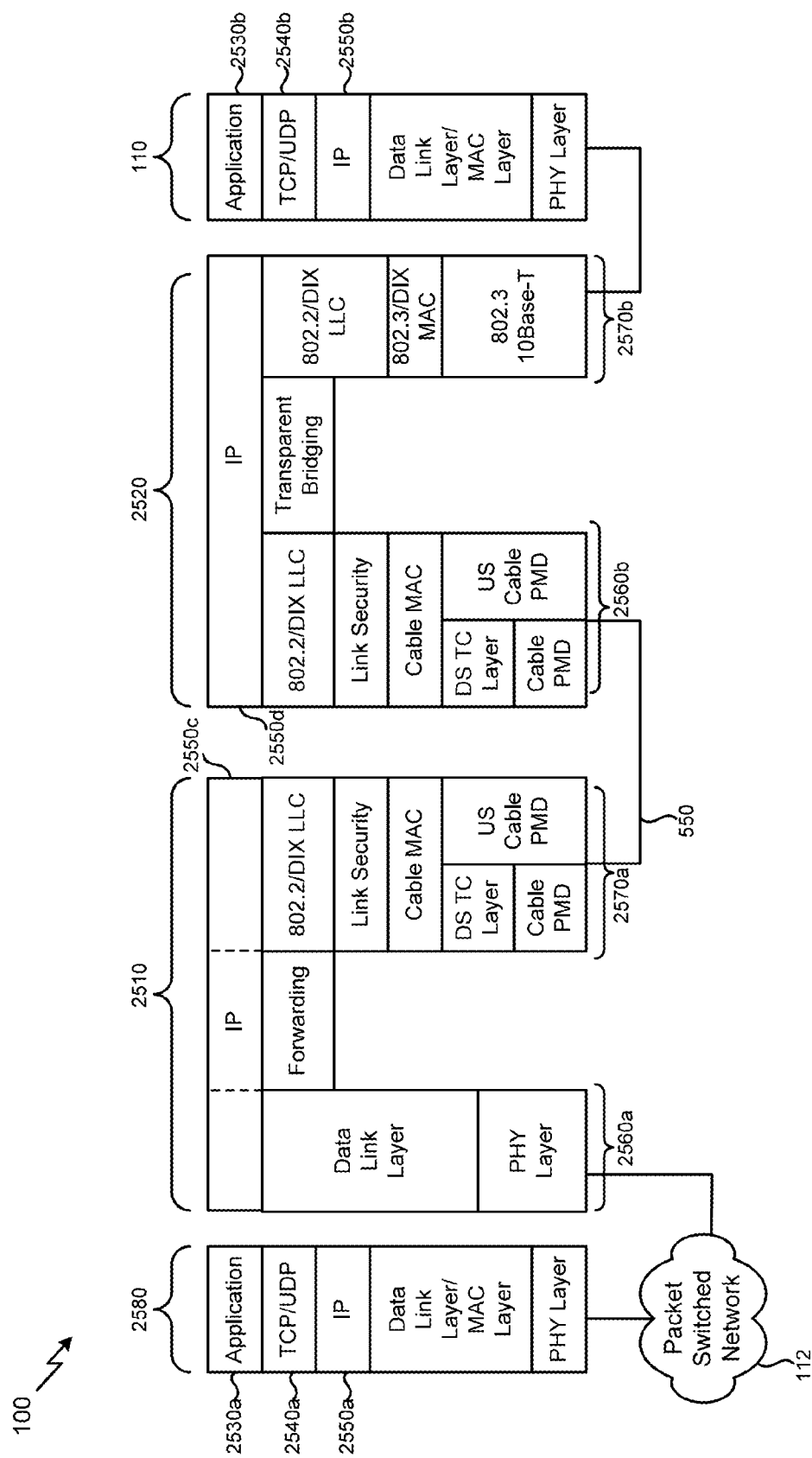
FIG. 25 illustrates layers of a system as defined by the Open Systems Interconnection (OSI) reference model.

FIG. 25 illustrates layers of a system, such as communication system 100, as defined by the Open Systems Interconnection (OSI) reference model. Referring to FIG. 25, communication system 100 includes a traffic source 2580, a CMTS stack 2510, a CM stack 2520, and a CPE 110. Traffic source 2580 may be a web server, a call server, a video server, a database server, a telephone, an endpoint for a peer-to-peer connection, or any other suitable source. CPE 110 may be a user's personal computer (PC), a network (e.g., LAN, WAN), a private branch exchange (PBX) box for voice-over-IP (VOIP), an IP telephone, a router, an intranet, etc.

A downstream transmission flows from Application Layer 2530*a*, TCP or UDP Layer 2540*a*, or IP Layer 2550*a* of traffic source 2580 through CMTS stack 2510 and CM stack 2520 to IP Layer 2550*b*, TCP or UDP Layer 2540*b*, or Application Layer 2530*b* of CPE 110. The downstream transmission flows from traffic source 2580 through packet switched network 112 to CMTS stack 2510. Packet switched network 112 may include a CMTS-Network Side Interface (CMTS-NSI), for example. In CMTS stack 2510, the downstream transmission flows through layers 2560*a*, IP Layer 2550*c*, and layers 2570*a*. The downstream transmission flows from CMTS stack 2510 to CM stack 2520 via one or more RF channels 550. In CM stack 2520, the downstream transmission flows through layers 2560*b*, IP Layer 2550*d*, and layers 2570*b*. The downstream transmission flows from CM stack 2520 to CPE 110 via an interface, such as a Cable Modem to Customer Premises Equipment (CMCI) Interface (SP-CMCI-108-020830). The downstream transmission flows through layers of CPE 110 to IP Layer 2550*b*, TCP or UDP Layer 2540*b*, or Application Layer 2530*b*.

An upstream transmission flows from Application Layer 2530*b*, TCP or UDP Layer 2540*b*, or IP Layer 2550*b* of CPE 110 through CM stack 2520 and CMTS stack 2510 to IP Layer 2550*a*, TCP or UDP Layer 2540*a*, or Application Layer 2530*a* of traffic source 2580. The upstream transmission flows from CPE 110 through the CMCI interface, for example, to CM stack 2520. In CM stack 2520, the upstream transmission flows through layers 2570*b*, IP Layer 2550*c*, and layers 2560*b*. The upstream transmission flows from CM stack 2520 to CMTS stack 2510 via one or more RF channels 550. In CMTS stack 2510, the upstream transmission flows through layers 2570*a*, IP Layer 2550*c*, and layers 2560*a*. The upstream transmission flows from CMTS stack 2510 to traffic source 2580 via packet switched network 112. The upstream transmission flows through layers of traffic source 2580 to IP Layer 2550*a*, TCP or UDP Layer 2540*a*, or Application Layer 2530*a*.

Information is transmitted between or among layers of communication system 100 in packets. A flow is a plurality of packets, the combination of which defines a video, an image, a Flash application, a text application, a table, a File Transfer Protocol (FTP) application, etc. A flow between UDP Layers 2540 of communication system 100 is referred to as a stream. A flow between TCP Layers 2540 of communication system 100 is referred to as a session. The term "flow" as used herein is defined generally to be compatible with UDP, TCP, and/or any other suitable protocol.

Figure 5A:
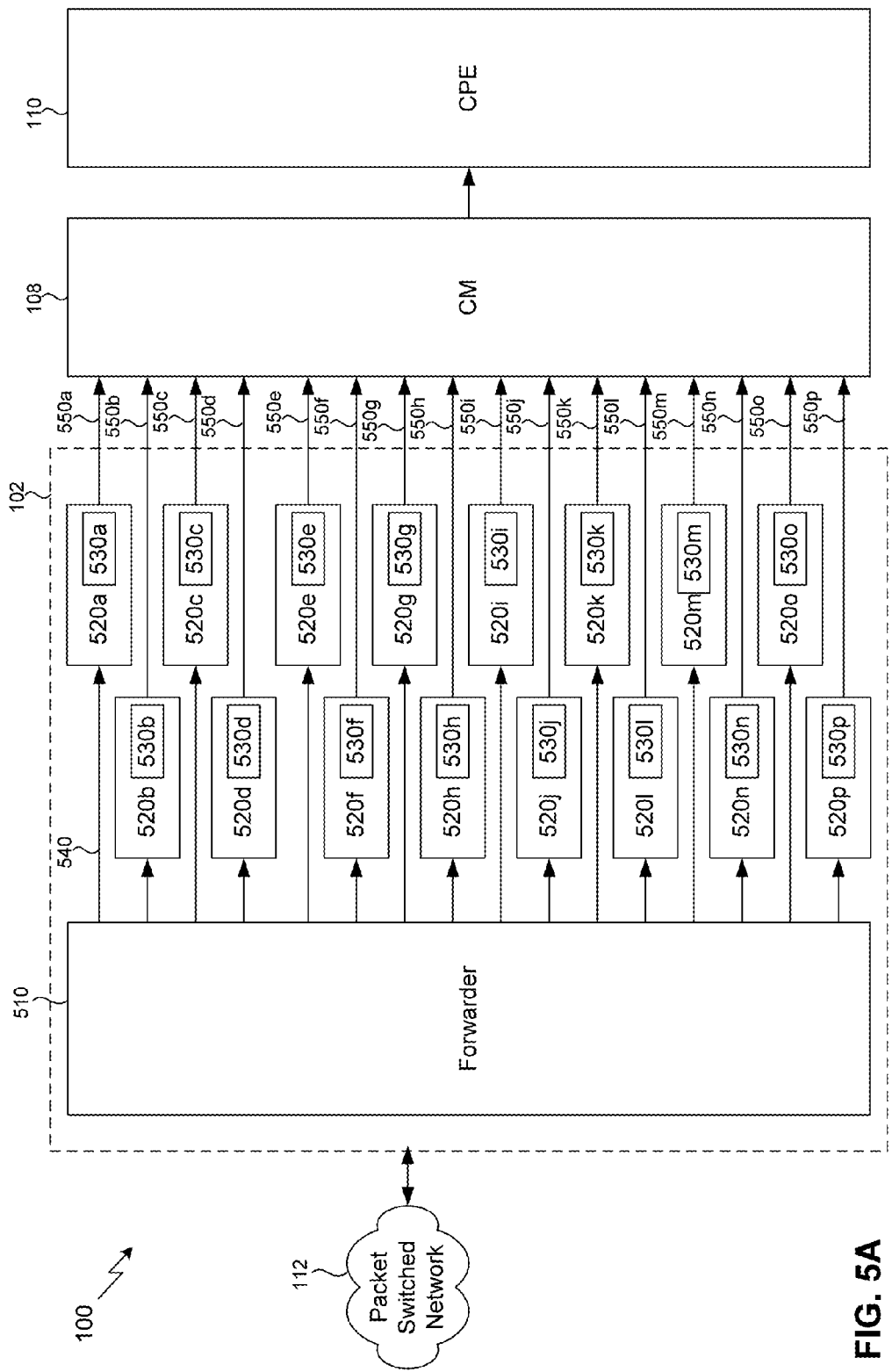
FIG. 5A illustrates a high-level block diagram of an example communication system having bonded RF channels according to an embodiment of the present invention.

FIG. 5A illustrates a high-level block diagram of example communication system 100 having bonded RF channels 550 according to an embodiment of the present invention. In FIG. 5A, headend 102 and a cable modem 108 are connected via RF channels 550. Headend includes forwarder 510 and a plurality of edge modulators 520*a-p*. In an aspect, edge modulators 520*a-p* are combined with CMTS 104 in a single box or chassis, for example. In another aspect, edge modulators 520*a-p* and CMTS 104 are in different boxes or chasses. In yet another aspect, edge modulators 520*a-p* are in different boxes or chassies.

Edge modulators 520*a-p* may utilize any suitable modulation technique, or combinations thereof. In a first embodiment, edge modulators 520*a-p* are edge quadrature amplitude modulators (edge QAMs). In a second embodiment, edge modulators 520*a-p* are edge orthogonal frequency division modulators (edge OFDMs). Forwarder 510 is coupled to each edge modulator 520 via a respective Ethernet link 540. Each edge modulator 520 includes a modulator 530 and is connected to cable modem 108 via a respective RF channel 550.

Referring to FIG. 5A, a user at CPE 110 may click on a link to a web page, which can load multiple applications, such as FTP, text, one or more images, a table, and/or a Flash application. A separate flow may be created for each application. For instance, a separate flow may be created for each image that is loaded. Generally, multiple flows are created for each user.

Although communication system 100 is shown in FIG. 5A to include a single user/CPE 110, communication system 100 may include multiple users/CPEs 110. Different users may be associated with different quality of service (QoS) requirements. If a first user clicks a link before a second user clicks a link, the first user need not necessarily receive flows associated with the link clicked by the first user before the second user receives flows associated with the link clicked by the second user.

If a web browser requests text and then an image, the text flow can be delivered after the image flow is delivered. However, proper transmission requires text of the text flow to be received by the user in the proper order. TCP generally orders packets of a flow, though UDP usually does not. For instance, UDP may discard out-of-order packets. Packets may be transmitted in order in the lower layers of communication system 100, regardless whether the packets are transmitted in order in the upper layers.

In FIG. 5A, packets may be transmitted through any one or more of RF channels 550 that are bonded. Bonded RF channels represent multiple physical paths between elements. In the embodiment of FIG. 5A, bonded RF channels 550 represent multiple physical paths between forwarder 510 and cable modem 108. Bonded RF channels 550 are logically connected, such that upper layers of communication system 100 treat bonded RF channels 550 as a single path. In other words, the upper layers treat bonded RF channels 550 as a single channel having an expanded bandwidth, rather than multiple RF channels 550 each having an associated bandwidth.

Referring back to FIG. 25, the phrase "upper layers" is relative, depending upon the layer that is the point of reference. According to an embodiment, "upper layers" are defined to include any layer from IP Layer 2550 up. If IP Layer 2550 is the reference layer, the upper layers include TCP/UDP Layer 2540 and Application Layer 2530, and lower layers include layers in the left-hand column 2560*a* and the right-hand column 2570*a* of CMTS stack 2510 and layers in the left-hand column 2560*b* and the right-hand column 2570*b* of CM stack 2520.

Bonding may include higher-layer bonding, which occurs at a higher layer of communication system 100 (e.g., at forwarder 510), lower-layer bonding, which occurs at a lower layer of communication system 100 (e.g., at an edge modulator 520), or a combination of higher-layer and lower-layer bonding. Higher-layer bonding may occur in IP Layer 2550, between TCP/UDP Layer 2540 and IP Layer 2550, or between IP Layer 2550 and the 802.2 Layer, to provide some examples. Lower-layer bonding may occur between the Cable MAC Layer and the Downstream (DS) TC Layer, for example.

Lower-layer bonding has advantages, as compared to higher-layer bonding. Lower-layer bonding has a lower latency due to relatively low delay variation. For instance, transmissions associated with lower-layer bonding are substantially synchronized, as compared to those associated with higher-layer bonding. Buffers used in lower-layer bonding often need not be as large as those used in higher-layer bonding. Higher-layer bonding and lower-layer bonding, whether performed independently or in combination, have advantages that will be further evident from the following discussion.

2.1 Higher-Layer Bonding

In FIG. 5A, forwarder 510 performs forwarding functions, such as scheduling flows to be transferred to one or more edge modulators 520 through respective Ethernet links 540. Forwarder 510 assigns each flow to a particular RF channel 550 or group of RF channels 550. According to an embodiment, forwarder 510 performs one or more MAC functions.

Referring to FIG. 5A, each edge modulator 520 is associated with a single RF channel 550 for illustrative purposes, though each edge modulator 520 may be associated with any suitable number of RF channels 550. Thus, in FIG. 5A, a flow that is assigned to a modulator 520 is transmitted to CM 108 via the RF channel 550 that is associated with that modulator 520. Forwarder 510 may provide to the assigned modulator 520 a port number, the type of data in the flow, and/or the application to which the flow is to be delivered, to provide some examples.

Forwarder 510 is configured to transfer flows to any one or more of edge modulators 520*a-p*. RF channels 550*a-p*, which are connected to edge modulators 520*a-p*, are said to be bonded and may be referred to as a "super bonding group". This type of bonding is "higher-layer" bonding.

Higher-layer bonding may be packet-based or flow-based. In packet-based higher-layer bonding, forwarder 510 assigns packets on an individual basis to one or more RF channels 550 of communication system 100. The packets are assigned irrespective of the flow in which they are included. For instance, a first packet of a flow may be assigned to RF channel 550*m*, a second packet of the flow may be assigned to RF channel 550*e*, a third packet of the flow may be assigned to RF channel 550*j*, and so on. The packets may be assigned based on loading at the queues of edge modulators 520 or any other suitable consideration. In packet-based higher-layer bonding, CM 108 or some other device must put the packets of a flow in the proper order. Thus, packet-based higher-layer bonding may require more buffering and result in a higher latency with respect to CM 108, as compared to flow-based higher-layer bonding.

In flow-based higher-layer bonding, forwarder 510 assigns different flows to different edge modulators 520, Ethernet links 540, RF channels 550, etc. Because each flow is independent, CM 108 is not necessarily required to buffer packets from a first RF channel 550 while waiting for a packet from a second RF channel 550, so that the packets of a flow may be put in order. Although different delays may be associated with different paths (e.g., RF channels 550, Ethernet links 540, etc.) from forwarder 510 to CM 108, the impact of the different delays on CM 108 is not significant.

Higher-layer bonding is further described below with reference to flow-based higher-layer bonding, though the scope of the invention is not limited in this respect. Forwarder 510 determines to which edge modulator 520 a flow or a plurality of flows is to be transmitted. This is referred to as load balancing when forwarder 510 distributes flows based on the load of each Ethernet link 540, edge modulator 520, RF channel 550, etc. For instance, forwarder 510 can make a determination based on the amount of data that is scheduled to be modulated by each edge modulator 520 or by a particular edge modulator 520. Forwarder 510 may assign a flow to edge modulator 520*p*, for example, because edge modulator 520*p* has less data in queue than the other edge modulators 520*a-o*.

Edge modulators 520 perform quadrature amplitude modulation based on information associated with the flows. In FIG. 5A, communication system 100 includes sixteen edge modulators 520 for illustrative purposes, though communication system 100 may include any suitable number of edge modulators 520.

A modulator 530 may perform MPEG framing functions, for example, with respect to packets of a flow received from forwarder 510. Modulators 530 may perform one or more MAC functions. A flow is transmitted to a cable modem 108 via RF channels 550 in response to packets of the flow being modulated by a modulator 530. Cable modem 108 forwards the flow to CPE 110.

Figure 5B:
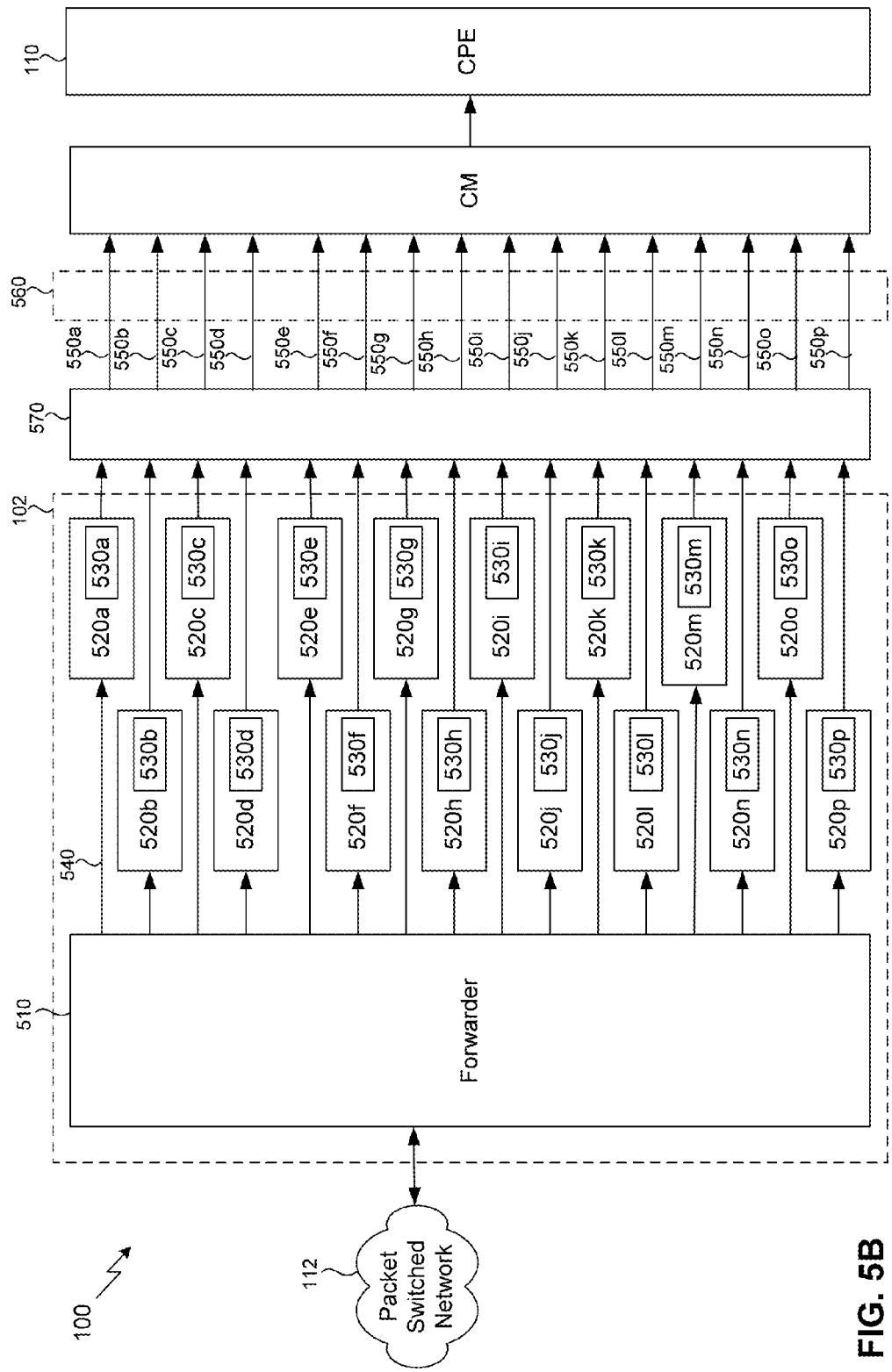
FIG. 5B illustrates a high-level block diagram of an example communication system having a combiner according to an embodiment of the present invention.

According to an embodiment, different RF channels 550 are associated with different frequencies. For instance, different edge modulators 520 may transmit flows along RF channels 550 at different frequencies. In the embodiment of FIG. 5B, RF channels 550 are combined in a coaxial cable 560, though RF channels 550 may be combined using any suitable transmission medium. In FIG. 5B, communication system 100 includes a combiner 570 coupled between edge modulators 520 and coaxial cable 560. Combiner 570 combines signals received from edge modulators 520 and transmits the signals at different frequencies through RF channels 550 that have been combined in coaxial cable 560. Coaxial cable 560 is coupled to cable modem 108. Cable modem 108 receives the flows from coaxial cable 560 and transmits the flows to CPE 110.

Figure 6:
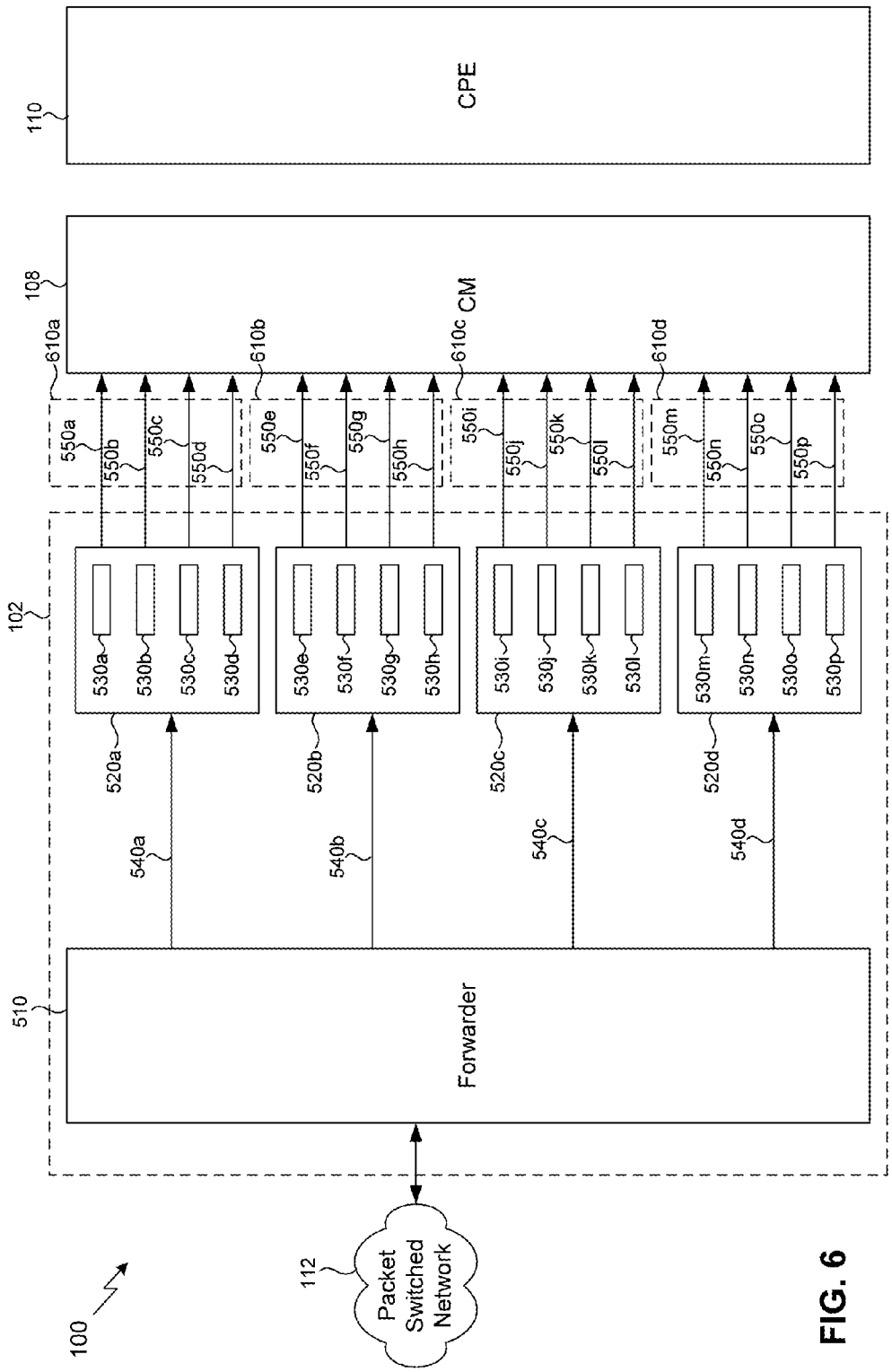
FIG. 6 illustrates a high-level block diagram of an example communication system in which RF channels are bonded using lower-layer bonding and higher-layer bonding according to an embodiment of the present invention.

FIG. 6 illustrates a high-level block diagram of example communication system 100 in which RF channels 550 are bonded using lower-layer bonding and higher-layer bonding according to an embodiment of the present invention. Referring to FIG. 6, communication system 100 includes four edge modulators 520*a-d* for illustrative purposes. Each edge modulator 520 receives packetized flows from forwarder 510 via a respective Ethernet link 540. Each edge modulator 520 includes one or more modulators 530. In FIG. 6, each edge modulator 520 includes four modulators 530, though edge modulators 520 may include any suitable number of modulators 530. Each edge modulator 520 need not necessarily include the same number of modulators 530.

RF channels 550 associated with a particular edge modulator 520 are referred to as a group 610 of RF channels 550. Group 610*a* is associated with edge modulator 520*a*, group 610b is associated with edge modulator 520b, and so on. In an embodiment, forwarder 510 assigns all packets of a flow to an edge modulator 520. For instance, rather than sending portions of a video stream to different edge modulators 520, all packets of the video stream are transmitted to a single edge modulator 520.

Assigning all packets of a flow to a particular edge modulator 520 may reduce or eliminate a need to put the packets in order (i.e., re-assemble the stream) from multiple groups 610. Not having to re-assemble the packets of the flow may save time and money. For instance, re-assembling the flow may require buffering packets until cable modem 108 detects a next successive packet. Packets of a flow that are received out-of-order may result in delays. Assigning all packets of the flow to one group 610 may reduce or eliminate latency associated with higher-layer bonding.

Higher-layer bonding may be performed in the absence of lower-layer bonding, as illustrated in FIGS. 5A and 5B. However, RF channels 550 may be relatively narrow, as compared to the flow(s) traveling through RF channels 550. For example, forwarder 510 may forward a streaming video flow, such as high-definition (HD) video, of 20 megabits (Mbits) on RF channel 550d. RF channel 550d may have a bandwidth of 40 Mbits. In this example, a single flow consumes half of the bandwidth of RF channel 550d. Transferring such large flows, as compared to the bandwidth of an RF channel 550, is not optimal. The efficiency of communication system 100 may be negatively effected based on a high ratio of flow size to RF channel bandwidth.

Forwarder 510 attempts to assign flows such that the flows are substantially evenly distributed among RF channels 550. An Ethernet link 540 that is connected to lower-layer bonded RF channels 550 appears to have an increased bandwidth from the perspective of forwarder 510. The bandwidth of the Ethernet link 540 is equal to the sum of bandwidths of all the bonded RF channels 550. Thus, lower-layer bonding is transparent at higher layers of communication system 100. For example, forwarder 510 "sees" group 610b of RF channels 550e-h as a single RF channel having a bandwidth equal to the sum of bandwidths of RF channels 550e-h.

With respect to the example provided above, including lower-layer bonding provides a group 610 of four RF channels 550 having a total bandwidth of 4×40 Mbits=160 Mbits. Thus, combining lower-layer bonding and higher-layer bonding, as illustrated in FIG. 6, provides more flexibility in transmitting relatively large flows. More flows can be transmitted via RF channels 550 that are lower-layer bonded and higher-layer bonded, as compared to RF channels 550 that are bonded using only higher-layer bonding.

Referring to FIG. 6, forwarder 510 makes load balancing decisions based on four expanded paths (i.e., Ethernet links 54a-d), rather than 16 narrow paths, as shown in FIGS. 5A and 5B. According to an embodiment, utilizing the four expanded paths allows forwarder 510 to load balance more efficiently.

Bonding RF channels 550 enables communication system 100 to support more users/CPEs 110, as compared to using non-bonded RF channels.

A group 610 of RF channels 550 benefits from an increased statistical multiplexing gain, as compared to individual RF channels 550. For example, an RF channel 550 having a bandwidth of B Mbps can support up to N users with some specified Quality of Service (QoS). The QoS is based on an assumption of adequate support of requirements pertaining to data rate, access delay, congestion probability, etc. The traffic may be bursty to some degree. If the RF channel 550 is combined with another RF channel 550 to form a group 610 having a bandwidth of 2B Mbps, the group is capable of supporting more than 2N users with the specified QoS, due to the statistical multiplexing gain. The amount of gain depends on the burstiness of the traffic. The statistical multiplexing gain G associated with a group 610 of RF channels 550, as compared to the individual channels 550, may be expressed as:

$$G = \frac{N(r*B) - r*N(B)}{r*N(B)} + 1,$$

where r>1 and N(x) is the maximum number of users supported by RF channels(s) having a bandwidth of x at a certain QoS.

Referring to FIG. 6, a flow that is assigned to one edge modulator 520 may be re-assigned to another edge modulator 520. For example, if a flow is initially assigned to edge modulator 520b and traffic at edge modulator 520b becomes congested, packets of the flow that have not yet been transmitted to edge modulator 520b may be re-assigned to another edge modulator 520a, c, or d. Transmission of the flow to edge modulator 520b may be terminated, and the remaining packets of the flow may be transmitted to edge modulator 520a, c, or d.

Redirecting the flow from edge modulator 520b to edge modulator 520a, c, or d may cause the cable modem 108 to receive one or more of the packets out of order. Any of a variety of means may be used to re-assemble the flow. According to an embodiment, forwarder 510 waits until a predetermined period of time has elapsed to begin transmitting the remaining packets of the flow to edge modulator 520a, c, or d. If the maximum delay associated with the Ethernet network is 5 milliseconds (ms), then forwarder 510 waits at least 5 ms between the time at which a packet of the flow is transmitted to edge modulator 520b and the time at which forwarder 510 begins transmitting to edge modulator 520a, c, or d. In another embodiment, packets of the flow are numbered before being transmitted by forwarder 510.

Figure 7:
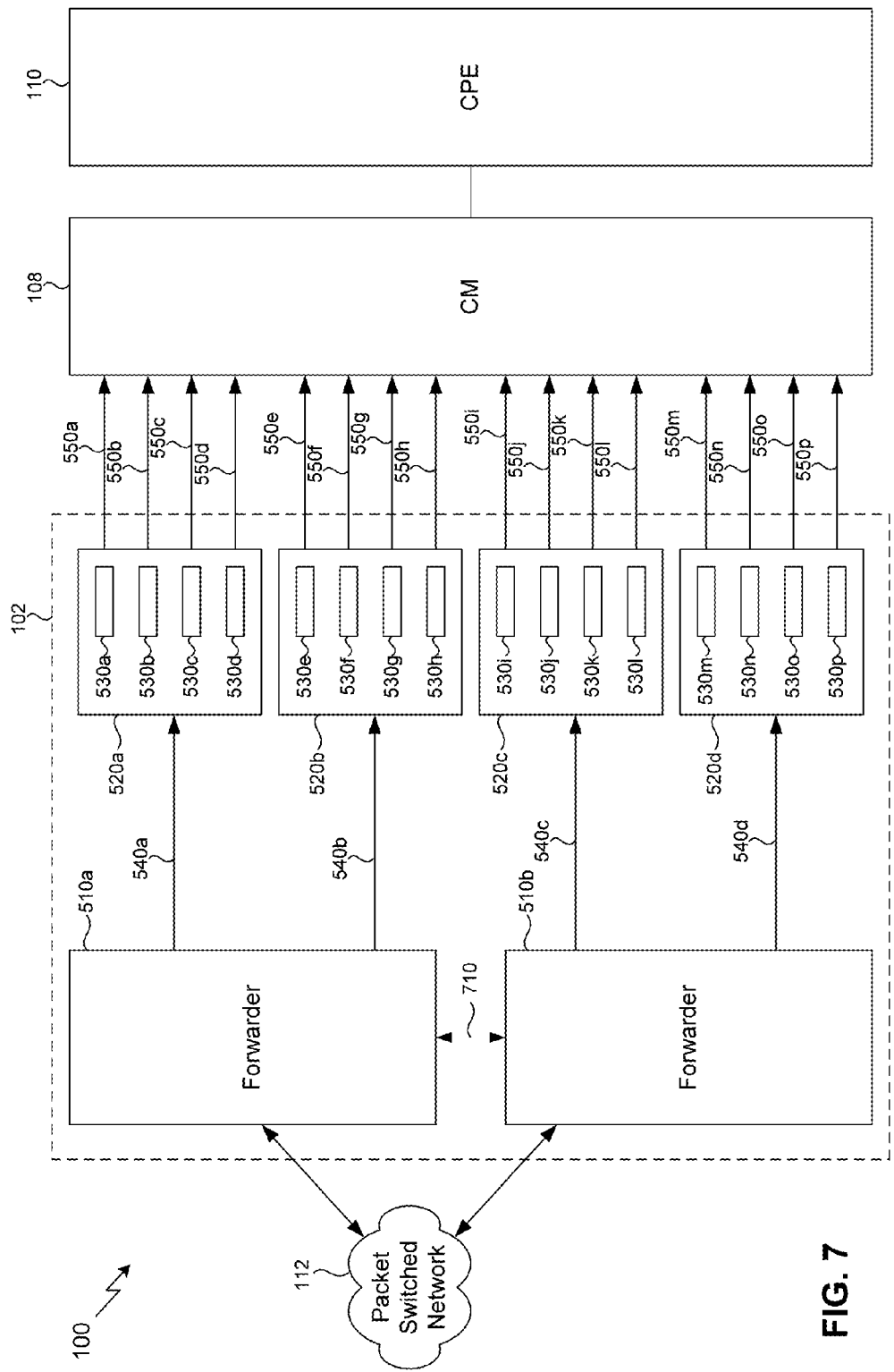
FIG. 7 illustrates a high-level block diagram of an example communication system having multiple forwarders according to an embodiment of the present invention.

Communication system 100 may include multiple forwarders, rather than the single forwarder 510 shown in FIGS. 5 and 6. FIG. 7 illustrates a high-level block diagram of example communication system 100 having multiple forwarders 510a and 510b according to an embodiment of the present invention. Packet switched network 112 is connected to forwarder 510a and forwarder 510b. Forwarders 510a and 510b are connected via a link 710. Link 710 may be an Ethernet link, though the scope of the invention is not limited in this respect.

In FIG. 7, forwarder 510a is connected to edge modulators 520a and 520b. Forwarder 510a assigns packets to edge modulator 520a or 520b depending on the congestion of each edge modulator 520a and 520b. For instance, forwarder 510a may assign a first flow to edge modulator 520a and a second flow to edge modulator 520b. Forwarder 510b is connected to edge modulators 520c and 520d. Forwarder 510b determines to which edge modulator 520c or 520d a flow or a plurality of flows is to be transmitted.

Figure 8:
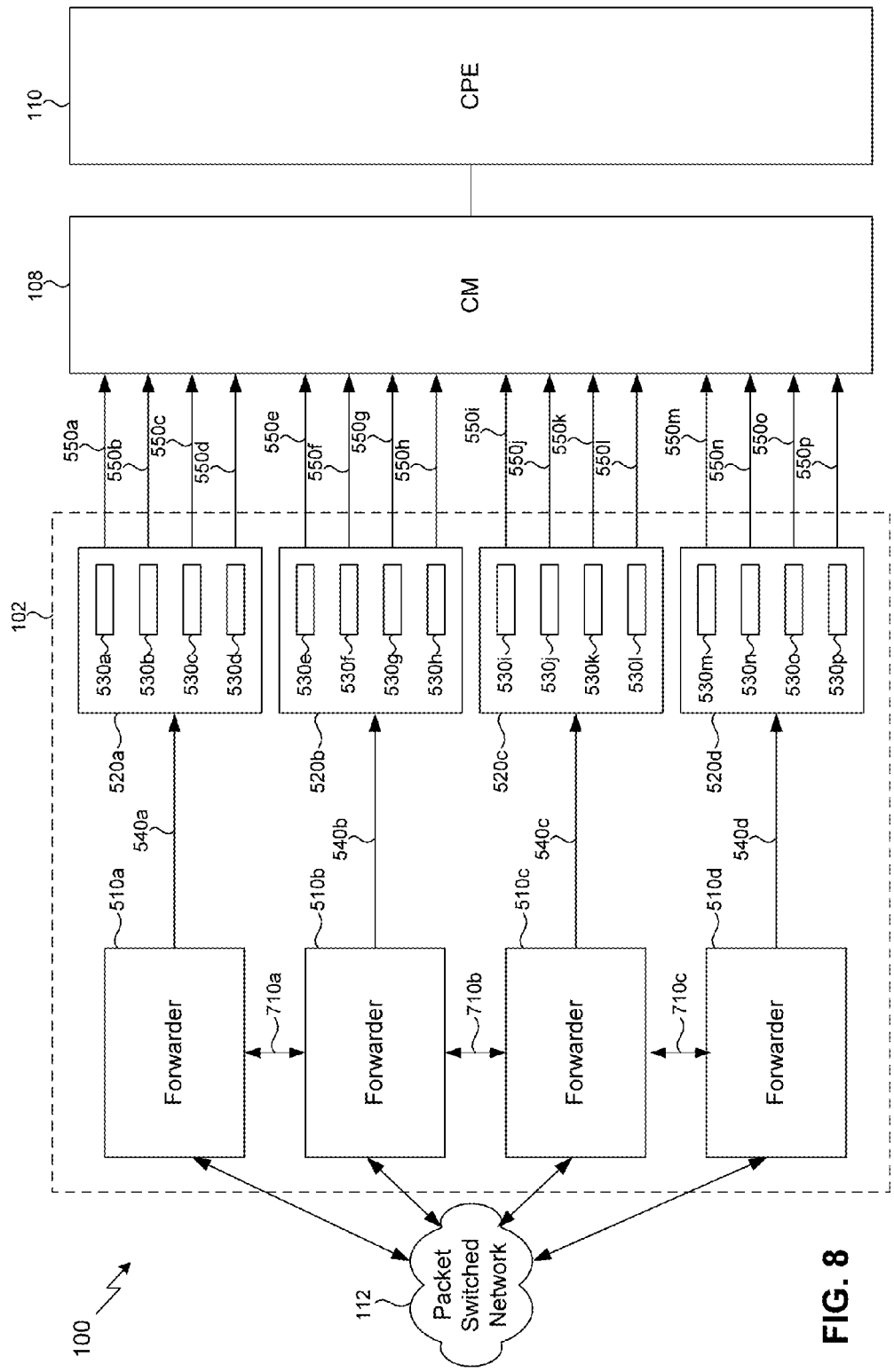
FIG. 8 illustrates a high-level block diagram of an example communication system having multiple forwarders according to another embodiment of the present invention.

FIG. 8 illustrates a high-level block diagram of example communication system 100 having multiple forwarders 510a-d according to another embodiment of the present invention. In FIG. 8, packet switched network 112 is connected to each forwarder 510. Each forwarder 510 is connected to a respective edge modulator 520. Each forwarder 510 determines whether one or more flows are to be transmitted to the respective edge modulator 520. Links 710 provide connectivity between forwarders 510.

Figure 9:
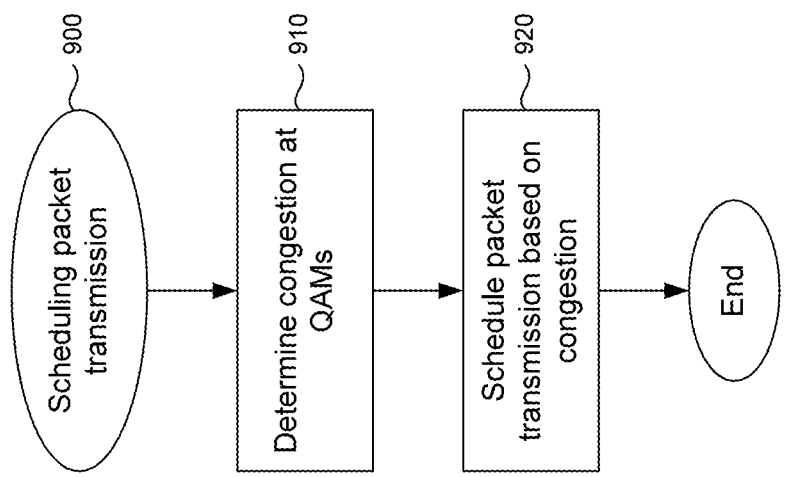
FIG. 9 is a flowchart of a method of scheduling packet transmission according to an embodiment of the present invention.

FIG. 9 illustrates a flowchart 900 of a method of scheduling packet transmission in accordance with an embodiment of the present invention. The invention, however, is not limited to the description provided by flowchart 900. Rather, it will be apparent to persons skilled in the relevant art(s) from the teachings provided herein that other functional flows are within the scope and spirit of the present invention.

Flowchart 900 will be described with continued reference to example communication system 100 described above in reference to FIG. 5A, though the method is not limited to that embodiment.

Referring now to FIG. 9, forwarder 510 determines the congestion at one or more of edge modulators 520, as shown in block 910. Forwarder 510 schedules a packet transmission based on the congestion, as shown at block 920. For instance, forwarder 510 may schedule one or more flows to be transmitted to an edge modulator 520 having a congestion below a threshold. The threshold may be predetermined or based on overall congestion of communication system 100, to provide some examples.

Figure 10:
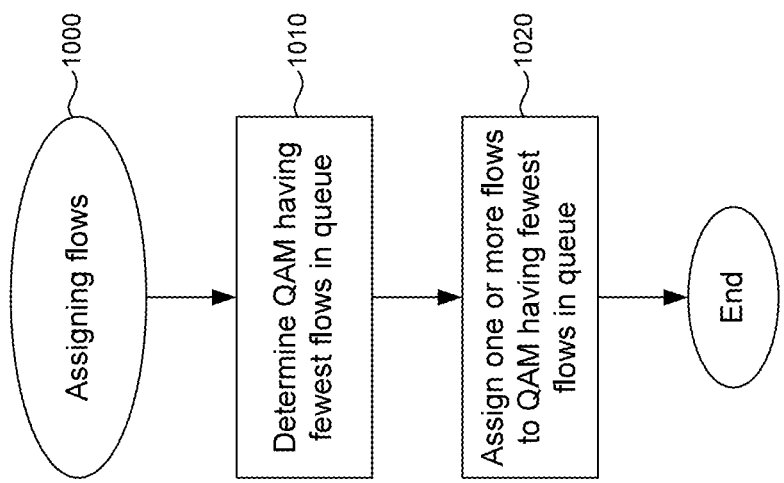
FIG. 10 is a flowchart of a method of assigning packets according to an embodiment of the present invention.

FIG. 10 illustrates a flowchart 1000 of a method of assigning flows in accordance with an embodiment of the present invention. The invention, however, is not limited to the description provided by flowchart 1000. Rather, it will be apparent to persons skilled in the relevant art(s) from the teachings provided herein that other functional flows are within the scope and spirit of the present invention.

Flowchart 1000 will be described with continued reference to example communication system 100 described above in reference to FIG. 5A, though the method is not limited to that embodiment.

Referring now to FIG. 10, forwarder 510 determines which edge modulator 520 of communication system 100 has the fewest flows in its queue, as compared to other edge modulators 520 of communication system, as shown at block 1010. At block 1020, forwarder 510 assigns one or more flows to an edge modulator 520 having the fewest flows in its queue. Forwarder 510 may transmit the assigned flow(s) to that edge modulator 520. Depending on the congestion of edge modulator 520, forwarder 510 may buffer the assigned flow(s) for later transmission. For instance, if the congestion of edge modulator 520 exceeds a threshold, forwarder 510 may buffer the assigned flow(s).

Figure 11:
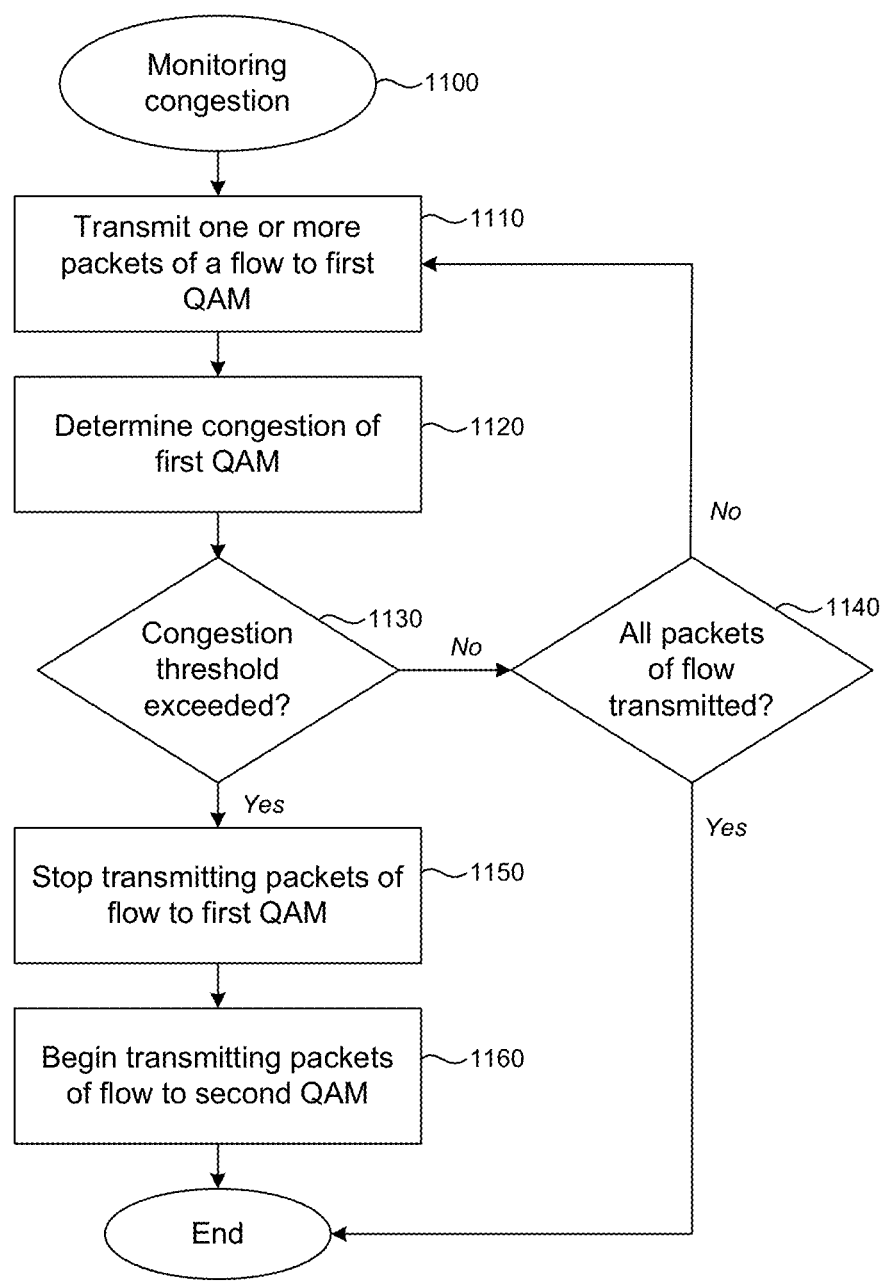
FIG. 11 is a flowchart of a method of monitoring congestion according to an embodiment of the present invention.

FIG. 11 illustrates a flowchart 1100 of a method of monitoring congestion in accordance with an embodiment of the present invention. The invention, however, is not limited to the description provided by flowchart 1100. Rather, it will be apparent to persons skilled in the relevant art(s) from the teachings provided herein that other functional flows are within the scope and spirit of the present invention.

Flowchart 1100 will be described with continued reference to example communication system 100 described above in reference to FIG. 5A, though the method is not limited to that embodiment.

Referring now to FIG. 11, forwarder 510 transmits one or more packets of a flow to a first edge modulator 520, as shown at block 1110. At block 1120, forwarder 510 determines the congestion of the first edge modulator 520. If the congestion exceeds a congestion threshold, as determined at decision block 1130, then forwarder 510 stops transmitting packets of the flow to the first edge modulator 520, as shown at block 1150. At block 1160, forwarder 510 begins transmitting packets of the flow to a second edge modulator 520, and the flow ends.

If the congestion threshold is not exceeded, as determined at decision block 1130, then forwarder determines whether all packets of the flow have been transmitted at decision block 1140. If all of the packets of the flow have been transmitted, as determined at decision block 1140, then the flow ends. Otherwise, control returns to block 1110, and one or more packets of the flow are transmitted to the first edge modulator 520.

2.2 Lower-Layer Bonding

An edge modulator 520 sends packets of a flow to the cable modem 108 via one or more RF channels 550 of a group 610 associated with that edge modulator 520. RF channels 550 within the group 610 are said to be bonded and may be referred to as a "group". This type of bonding is "lower-layer" bonding. An advantage of lower-layer bonding is that latency associated with re-assembling a flow including packets, which have been divided among multiple RF channels 550, is not substantial. According to an embodiment, the latency is negligible. Thus, lower-layer bonding may be packet-based.

Figure 12:
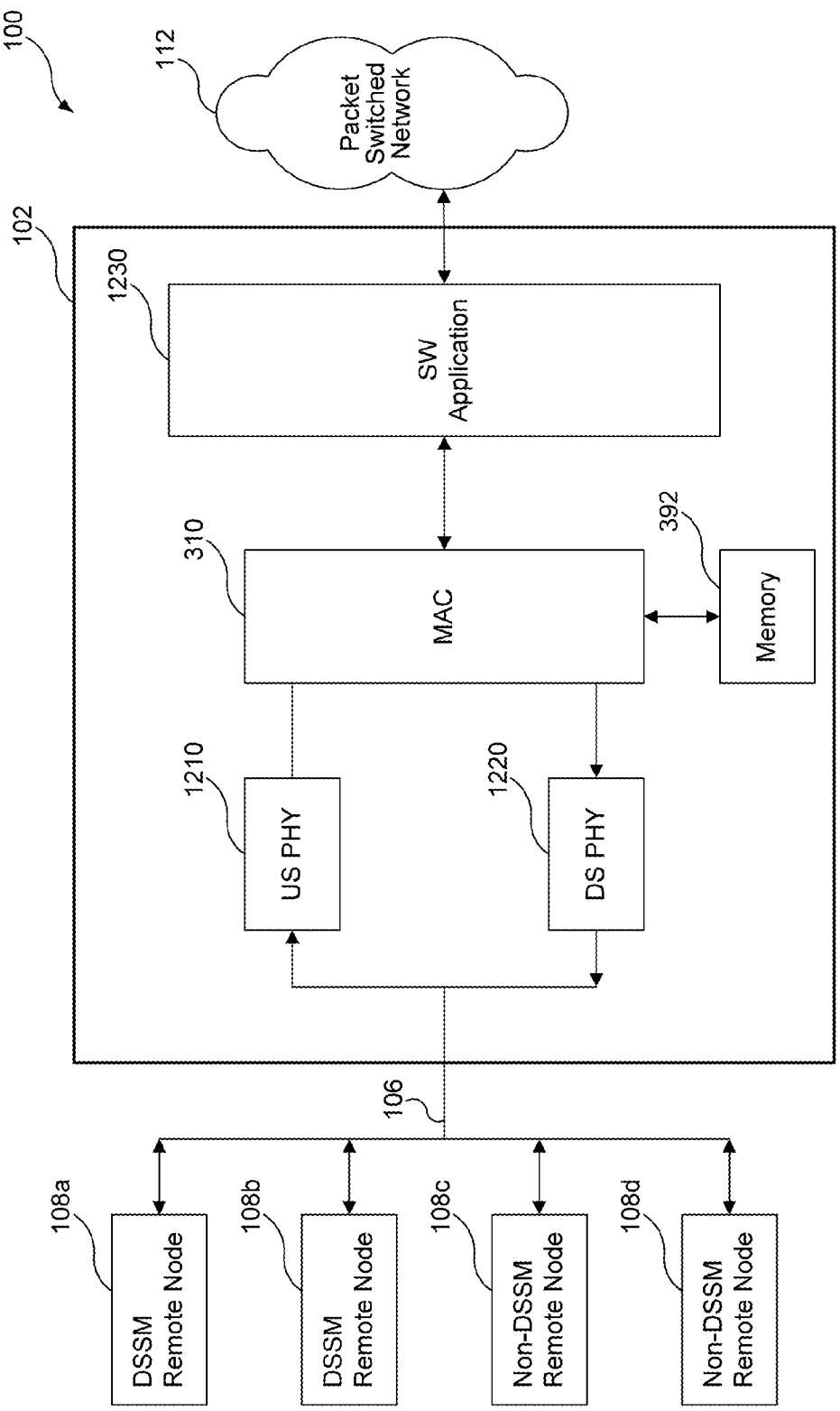
FIG. 12 illustrates a communication system according to an embodiment of the present invention.

In FIG. 12, communication system 100 includes one or more widely distributed remote communications nodes 108a-108d (e.g., cable modems) connected to internodal infrastructure 106. Internodal infrastructure 106 includes four downstream channels for illustrative purposes, though the scope of the invention is not limited in this respect. Communication system 100 further includes a software application 1230 as described above with reference to FIG. 3. Communication system 100 may be implemented in any multimedia distribution network. Furthermore, it should be understood that the method and system of the present invention can manage the exchange of voice, data, video, audio, messaging, graphics, other forms of media and/or multimedia, or any combination thereof.

Referring to FIG. 12, the operation and/or management of non-DSSM and DSSM-capable communications nodes 108 are integrated within the same communication system 100. In an embodiment, remote communications nodes 108a-108b are DSSM-capable, and remote communications nodes 108c-108d are non-DSSM-capable (e.g., legacy cable modems). The quantity of non-DSSM and/or DSSM-capable remote communications nodes 108 may vary as determined by the system architect. The four remote communications nodes 108, depicted in FIG. 12 and described herein, are provided for illustrative purposes. More or fewer remote communications nodes 108 may be implemented.

2.2.1 Operational Flow for DSSM Communications

In an embodiment, communication system 100 includes methodologies and/or techniques for mixing the traffic for non-DSSM-capable remote communications nodes 108c-108d and DSSM-capable remote communications nodes 108a-108b. This can be described with reference to FIG. 13, in which flowchart 1300 illustrates the general operational flow of an embodiment of the present invention. More specifically, flowchart 1300 shows an example of a control flow for transmitting a DSSM packet to a non-DSSM-capable and/or DSSM-capable remote communications node 108. The invention, however, is not limited to the description provided by flowchart 1300. Rather, it will be apparent to persons skilled in the relevant art(s) from the teachings provided herein that other functional flows are within the scope and spirit of the present invention.

Flowchart 1300 will be described with continued reference to example communication system 100 described above in reference to FIG. 12, though the method is not limited to that embodiment.

The control flow of flowchart 1300 begins at step 1301 and passes immediately to step 1303. At step 1303, a packet is accessed for downstream processing. Headend 102 receives information (including control messages and data from, for example, subscriber services) that has been designated to be packetized and transmitted to an end-user communicatively coupled to a remote communications node 108.

At step 1306, protocol processing is performed to prepare the packet for the downstream. Protocol processing includes payload header suppression, data encryption standard (DES) encryption, and/or the like. In an embodiment, the protocol processing complies with the requirements of the DOCSIS™ 2.0 protocol, which includes the creation of a "regular" DOCSIS™ header with extended headers (EHDRs), header checksum (HCS), and/or the like. As discussed above, protocol processing may be performed by MAC 310.

At step 1309, it is determined whether the packet will be sent to a DSSM-capable remote communications node(s) 108a-108b or to a non-DSSM-capable remote communications node(s) 108c-108d. For a non-DSSM-capable packet, the control flow passes to step 1312. Otherwise, control passes to step 1318.

At step 1312, the non-DSSM packet is framed and encapsulated. In an embodiment, an encapsulation header is created to mark the packet as being a non-DSSM packet. Thus, the original packet is "encapsulated" behind the new "outer" header.

At step 1315, the packet is transmitted on a single channel in the downstream (i.e., over internodal infrastructure 106) to all remote communications nodes 108.

At step 1318, the packet is prepared for a DSSM transmission. The packet is split into a predesignated quantity of pieces. In an embodiment, the predesignated quantity matches the quantity of available downstream channels. As discussed above in reference to FIG. 12, headend 102 includes four carriers in communications with four remote communications nodes 108. As such, four downstream channels are available in communications system 100 for the DSSM-capable remote communications nodes 108a-108b. Although the present invention is described with reference to four identical channels for illustrative purposes, the quantity of channels may vary as determined by the system architect. More or fewer channels can be implemented.

In an embodiment, byte-level splitting is used to produce the predesignated quantity of pieces. As such, the packet from step 1309 is divided, one byte at a time, over the four available channels in the order it is received. For example, the first byte of the packet becomes the first byte of the protocol data unit (PDU) for channel 0, the second byte of the packet becomes the first byte of the PDU for channel 1, the third byte of the packet becomes the first byte of the PDU for channel 2, the fourth byte goes to channel 3 in the same way, the fifth byte of the original packet then becomes the second byte of the PDU for channel 0, the sixth byte goes to channel 1, and so forth. The result is four "pieces", one for each of the four available channels, all with lengths within a byte of each other.

In another embodiment, packet-level splitting is used to produce the predesignated quantity of pieces. As such, the packet from step 1309 is divided into four units of MPEG packets. For example, a first portion (e.g., the first 183 bytes) of the packet) becomes the PDU for channel 0, the next portion (e.g., the next 183 bytes) becomes the PDU for channel 1, and so forth. Each unit, representing a "piece", is sent at the same time on the four available channels. In another embodiment, if packet-level splitting is implemented, PDUs may be the same size but synchronization requirements across channels may be relaxed at the expense of increased buffering in the remote communications nodes 108.

Byte-level splitting and packet-level splitting are described herein by way of example, and not limitation. Other splitting techniques may be implemented in other embodiments of the present invention, and may be used to produce a plurality of packet pieces to be sent at substantially the same time over a plurality of available channels. It is assumed that the four channels are all identical (e.g., same baud rate, modulation order, and interleaver settings). If the available channels are not identical, the bytes are assigned to the channels in a well-defined order such that reconstruction is deterministic and all pieces take substantially the same amount of time to send on the downstream. In an embodiment, bytes are assigned to each channel relative to the channel rates, instead of the "round robin" assignment described above. For example if byte-level splitting is implemented and if channel B is twice as fast as channel A, one byte would be sent on channel B, followed by two bytes on channel A, followed by one byte on channel B, and so forth. The exact ordering of bytes on the channels may be specified in a similar manner for any ratio of channel bandwidths. If packet-level splitting is implemented and if channel B is twice as fast as channel A, the byte size for the PDU being sent on channel B is twice the byte size of the PDU being sent on channel A.

At step 1321, each piece is framed and encapsulated as a DSSM packet. In an embodiment, an encapsulation header is created to designate the channel that the bytes, within the piece, have been assigned. Thus, each of the four pieces is "encapsulated" behind their respective new "outer" header.

At step 1324, the four pieces are transmitted simultaneously on all four channels of the downstream. These pieces are transmitted beginning at the same time (as indicated by the timestamp count or other suitable reference) on all four channels. A deterministic padding algorithm is used to make each piece take the same amount of time to transmit, in order to guarantee that the next packet may also start at the same time on each channel.

At step 1327, if additional packets are received for the downstream, the control flow returns to step 1303, and the process is repeated. Otherwise, the control flow ends as indicated by step 1395.

As discussed, DSSM and non-DSSM packets are encapsulated to distinguish DSSM packets from non-DSSM packets and/or identify the downstream channel for transmitting a DSSM packet piece. Therefore, the present invention includes a mechanism for mixing the traffic for DSSM-capable remote communications nodes 108a-108b and non-DSSM-capable remote communications nodes 108c-108d. The mixing mechanism enables the DSSM traffic to be silently discarded by non-DSSM-capable remote communications nodes 108c-108d. As a result, the packets for the DSSM-capable remote communications nodes 108a-108b would not cause problems for non-DSSM-capable remote communications nodes 108c-108d, such as legacy cable modems.

In an embodiment, the mixing mechanism of the present invention is implemented by using a "reserved" FC type field in an encapsulation header. The FC type field is defined in the DOCSIS™ 1.1 and 2.0 specifications as being "reserved for future use." If the two-bit FC type of a header is denoted as "2'b10", a DOCSIS™ 1.1 and 2.0 cable modem is required to silently discard the packet by using the length field to skip over the PDU. As such, a "2'b10" designation in the FC type field of an encapsulation header is used to mark a packet as being a DSSM packet. This mixing mechanism can be explained with reference to FIG. 14.

Figure 14:
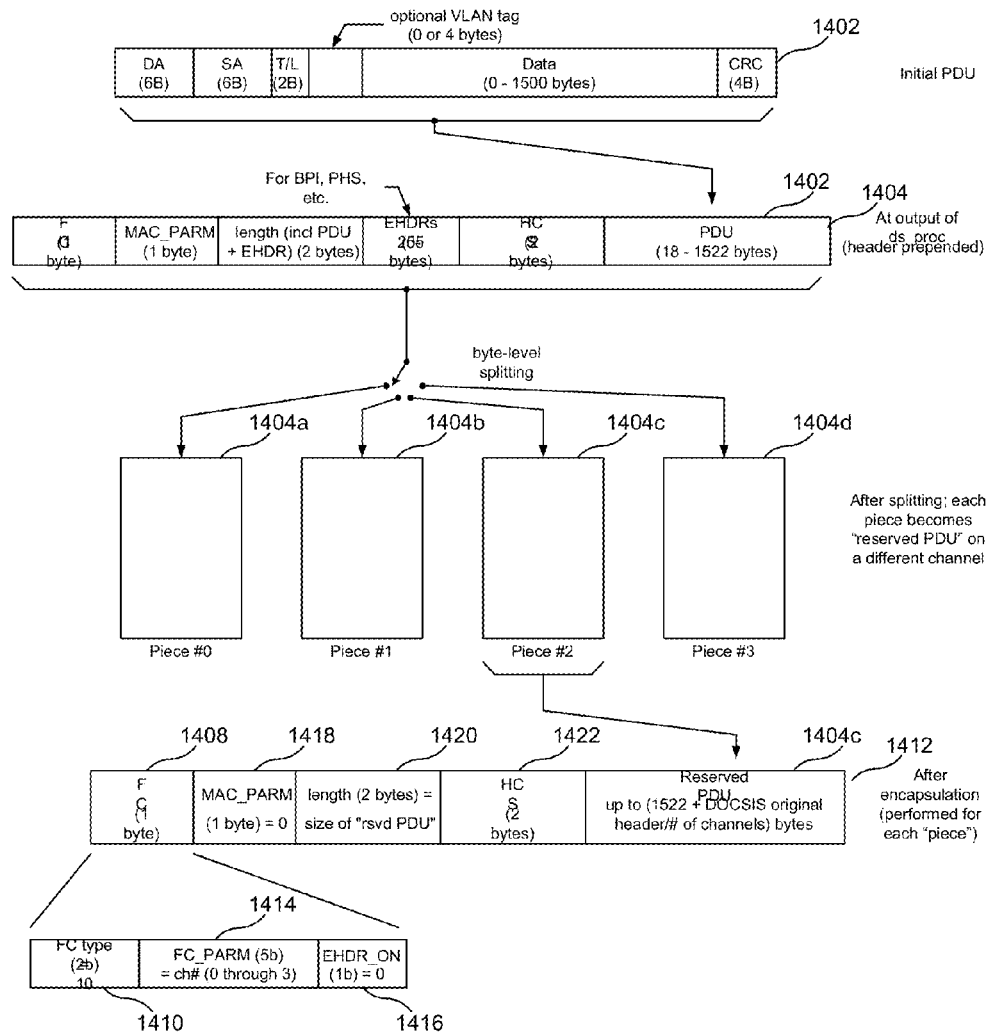
FIG. 14 illustrates MAC-layer packet formats for various layers of a DSSM packet, according to an embodiment of the present invention.

FIG. 14 illustrates MAC-layer packet formats for various layers of a DSSM packet 1412, according to an embodiment of the present invention. As shown, an initial PDU 1402 is accessed to be prepared for the downstream, as discussed above with reference to the step 1303. PDU 1402 includes a data field, a destination address (DA), source address (SA), type and length field (T/L) that either specifies the quantity of bytes in the payload or indicates the type of payload, and a cyclical redundancy check (CRC) value that has been calculated for error checking During protocol processing (e.g., at step 1306), a header is created for PDU 1402 that includes information for frame control (FC), MAC parameter (MAC_PARM), length (LEN) of PDU 1402 and the protocol header, EHDR, and HCS. Upon completion of protocol processing, the resulting packet 1404 is split into a predesignated quantity of pieces 1404a-1404d. As discussed with reference to step 1318, byte-level splitting is used in an embodiment to produce the pieces 1404a-1404d based on a round robin assignment or another technique that ensures all pieces 1404a-1404d take substantially the same amount of time to be transmitted downstream.

As shown in FIG. 14, an encapsulation header is created for piece 1404c to mark it as being a DSSM packet 1412. Thus, each piece 1404a-1404d receives an encapsulation header that includes information for a MAC_PARM field 1418, a LEN field 1420, a HCS field 1422, and the PDU representing the respective piece 1404a-1404d. The encapsulation header also includes a FC field 1408 that specifies whether the piece 1404a-1404d is a DSSM packet 1412 or not. As discussed above, a "reserved" FC type field 1410 is denoted as "2'b10" to mark a packet as being a DSSM packet 1412. FC field 1408 also includes information for a frame control parameter (FC_PARM) 1414 that specifies which available downstream channel the piece 1404a-1404c has been assigned (as discussed above at step 1318). FC field 1408 also includes an EHDR field 1416 that indicates whether an EHDR is present.

Therefore, a DSSM packet 1412 in accordance with an embodiment of the present invention is the by-product of a packet 1404 being split into a designated quantity of pieces (e.g., 1404a-1404d) and encapsulated with the following information. The FC type 1410 is set to "10", the FC_PARM 1414 indicates the assigned downstream channel (e.g., channel number 0, 1, 2, or 3), the EHDR field 1416 indicates that no EHDR is present, the MAC_PARM field 1418 is set to "0", the LEN field 1420 indicates the size of PDU for the piece 1404a-1404d, and the HCS field 1422 is specified as usual.

Conversely, a non-DSSM packet, according to an embodiment of the present invention, is encapsulated with a header that specifies the FC type 1410 as being any value except for "10". For example, the FC type 1410 for a non-DSSM packet may be set to "0", "reserved", or the like.

As described, an FC type field (e.g., FC type 1410) provides a mixing mechanism for the present invention when byte-level splitting is utilized to split a packet (e.g., packet 1404) into a predesignated quantity of pieces (e.g., pieces 1404a-1404d). In another embodiment, the mixing mechanism of the present invention is implemented by using a program identifier (PID) in an MPEG transport/encapsulation header. The PID field is defined in the DOCSIS™ 1.1 and 2.0 specifications as being "0x1FFF" to designate a legacy packet (i.e., non-DSSM packet). If the thirteen-bit PID field is denoted as any value other than "0x1FFF", a DOCSIS™ 1.1 and 2.0 cable modem is required to silently discard the packet. As such, a "0x1FFF" designation in the PID field of an encapsulation header is used to mark a packet as being a non-DSSM packet. Any other designation in the PID field is used to mark a packet as being a DSSM packet. This mixing mechanism can be explained with reference to FIG. 15.

Figure 15:
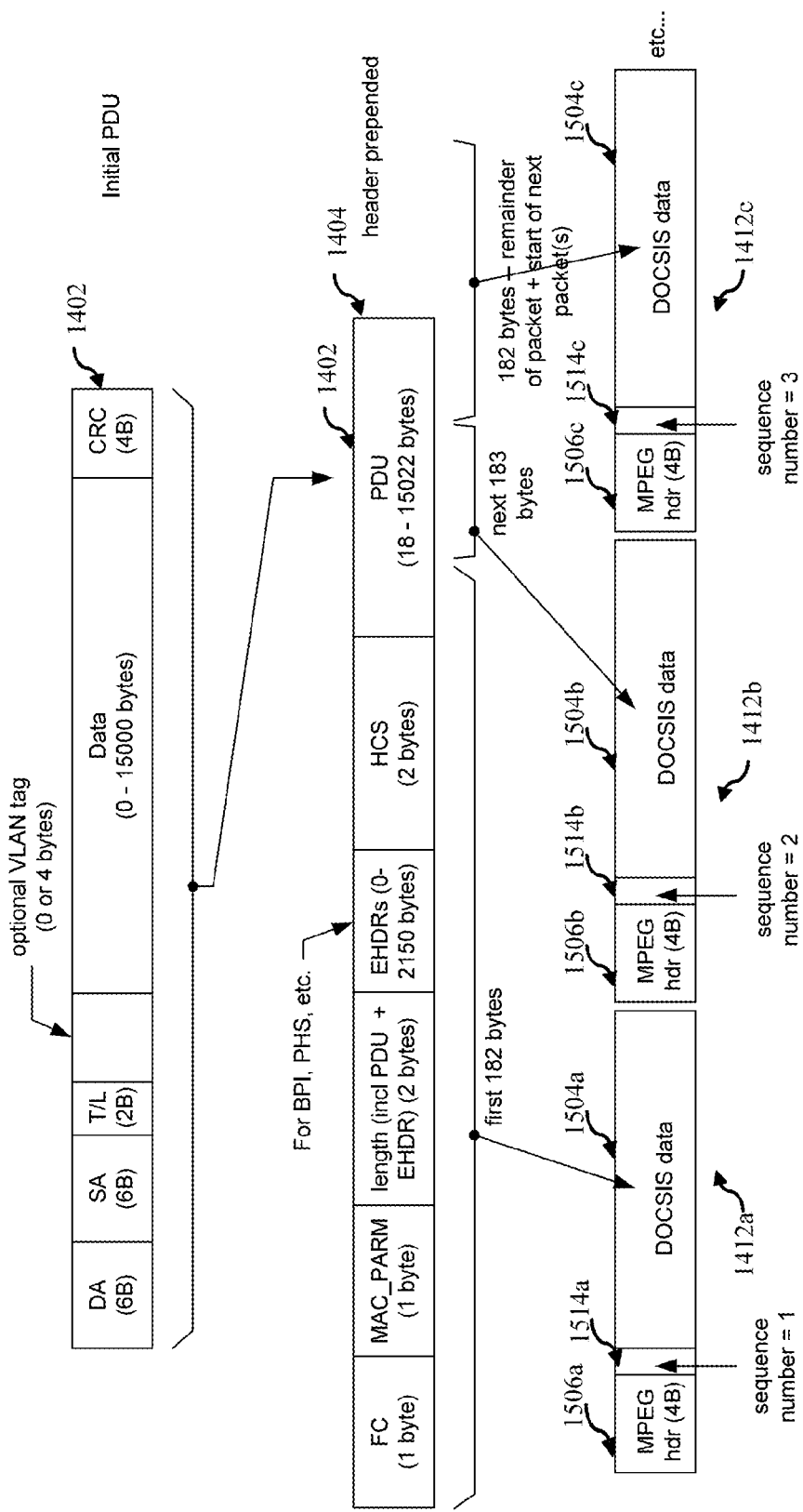
FIG. 15 illustrates MAC-layer packet formats for various layers of a DSSM packet, according to another embodiment of the present invention.

FIG. 15 illustrates MAC-layer packet formats for various layers of a DSSM packet 1412, according to another embodiment of the present invention. As shown, an initial PDU 1402 is accessed to be prepared for the downstream, as discussed above with reference to the step 1303. During protocol processing (e.g., at step 1306), a header is created for PDU 1402 to produce the resulting packet 1404, which is, thereafter, split into a predesignated quantity of pieces 1504a-1504c. In this example, packet-level splitting is implemented (as discussed above with reference to step 1318) to produce the pieces 1504a-1504c.

As shown in FIG. 15, an encapsulation header is created for each piece 1504a-1504c to mark it as being a DSSM packet 1412. Each piece 1504a-1504c receives an encapsulation header that includes an MPEG header 1506a-1506c (referred collectively herein as MPEG header 1506) and a sequence number 1514a-1514c (referred collectively herein as sequence number 1514). MPEG header 1506 is produced during a MPEG framing step, which allows the packet splitting to take advantage of an existing MPEG frame structure. The sequence number 1514 is actually the first byte of the PDU (i.e., piece 1504a-1504c), and represents the ordering of the resulting DSSM packets 1412a-1412c. Sequence number 1514 is similar to the FC_PARM 1414 (describe above with reference to byte-level splitting) and is used to help determine packet ordering for reassembly.

Figure 16:
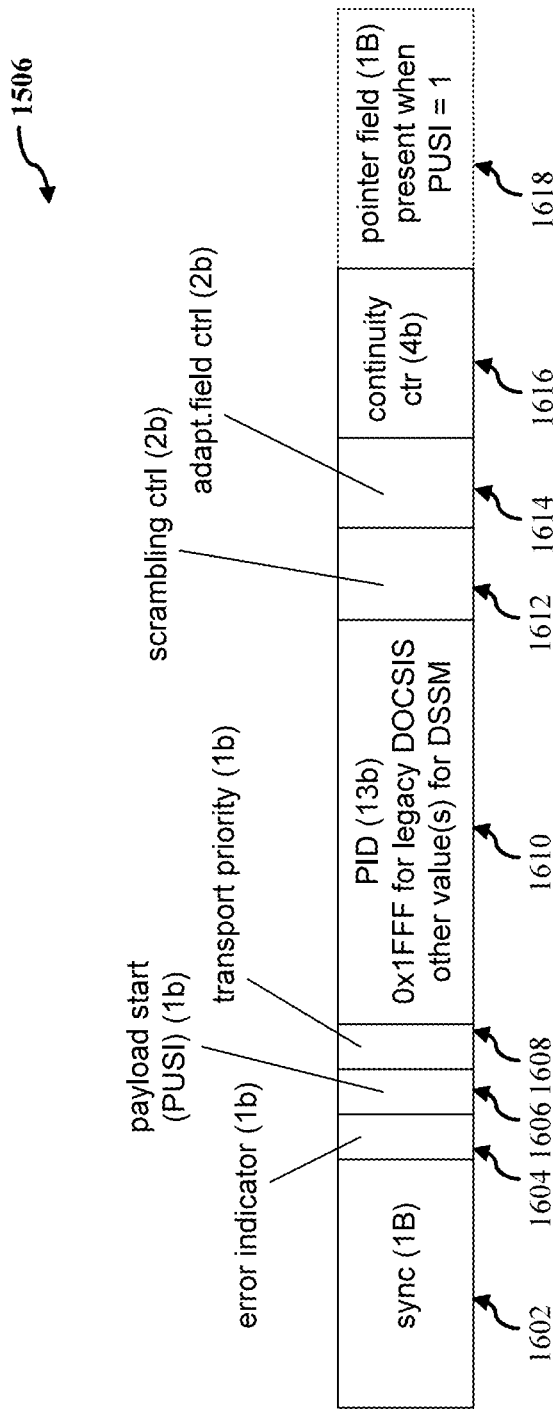
FIG. 16 illustrates an MPEG header for a MAC-layer packet, according to an embodiment of the present invention.

FIG. 16 illustrates an embodiment of MPEG header 1506 that is useful for implementing aspects of the present invention. MPEG header 1506 a synchronization byte 1602, a transport error indicator 1604, a payload unit start indicator (PUSI) 1606, a transport priority 1608, a PID 1610, a transport scrambling control 1612, an adaptation field control 1614, a continuity counter 1616, and a pointer field 1618.

Synchronization byte 1602 is a one-byte field that generally contains the value "0x47". However, some PHY layer coding schemes (e.g., J.83 Annex A) may modify this value.

Transport error indicator 1604 is a one-bit field that is used for error detection. A sending device transmits zero for this bit, and a receiving device may set the field to one, if the receiving device detects errors in the packet (e.g., packet 1412).

PUSI 1606 is a one-bit field. When set, PUSI 1606 indicates that pointer field 1618 is present and points to the location within a packet (e.g., packet 1412) where a new DOCSIS™ frame may begin.

Transport priority 1608 is a one-bit field that is generally set to zero because it is not used by a DOCSIS™-compliant system.

PID 1610 is a thirteen-bit field. As discussed above, PID 1610 is set to "0x1FFF" for a DOCSIS™ 1.x and/or 2.0 system. This value therefore designates a non-DSSM packet (e.g., legacy packet). If PID 1610 contains any value other than "0x1FFF", the packet (e.g., packet 1412) is designated as a DSSM packet. The DSSM value for PID 1610 may be any publicly assigned value, or something configurable on different systems. If the value of PID 1610 is not "0x1FFF", a legacy cable modem would ignore the packet (similarly to the way a packet is discard if the two-bit FC type field 1414 is denoted as "2'b10" as described above for byte-level splitting).

Transport scrambling control 1612 is a two-bit field that is not used in a DOCSIS™-compliant system, and is therefore generally set to zero.

Adaptation field control 1614 is a two-bit field. For a DOCSIS™-compliant system, adaptation field control 1614 contains the value "01b", which (according to the telecommunications standard defined by ITU-T Rec. H.222 for video transport) indicates that no adaptation field is present.

Continuity counter 1616 is a cyclic counter that increments by one for each packet (e.g., packet 1412) sent using this four-bit field.

Pointer field 1618 is a one-byte field. In accordance with the DOCSIS™ specifications, pointer field 1618 contains the number of bytes in the packet (e.g., packet 1412) that immediately follow pointer field 1618 that a receiving decoder (e.g., remote communications nodes 108a-108d) must skip past before looking for the beginning of a DOCSIS™ MAC frame. Pointer field 1618 is only present if the PUSI bit 1606 is set.

When pointer field 1618 is present, the payload (e.g., piece 1504a and sequence number 1514a) contains 183 bytes. Referring back to FIG. 15, piece 1504a contains 182 bytes and sequence number 1514a contains one byte. If, on the other hand, there is no pointer field 1618, the payload contains 184 bytes. Referring once again to FIG. 15, piece 1504b contains 183 bytes and sequence number 1514b contains one byte. Thus, in an embodiment, the total size of a MPEG packet (e.g., packet 1412), including header 1506, is always 188 bytes. According to DOCSI™, the payload data contains "stuff bytes" (0xFF) when there is no data to send.

Therefore, a DSSM packet 1412 produced from packet-level splitting is the by-product of a packet 1404 being split into a designated quantity of pieces (e.g., 1504a-1504c) and encapsulated with the following information. The PID 1610 is set to any value other than "0x1FFF", and the sequence number 1514a-1514c indicates the ordering for reassembling the resulting DSSM packets 1412a-1412c. Conversely, a non-DSSM packet, according to an embodiment of the present invention, is encapsulated with a header that specifies the PID 1610 as set "0x1FFF".

Referring to FIGS. 1-5, the encapsulation header is created on all four downstream channels of internodal infrastructure 106. As such, a packet 1404 is divided for DSSM transmission, at step 1318 over the four channels in the order they are numbered in the FC_PARM field 1414, sequence number 1514, or the like. As discussed, four channels have been shown and described for illustrative purposes. In other embodiments of the present invention, more or fewer channels are implemented, as determined by the system architect.

Figure 17:
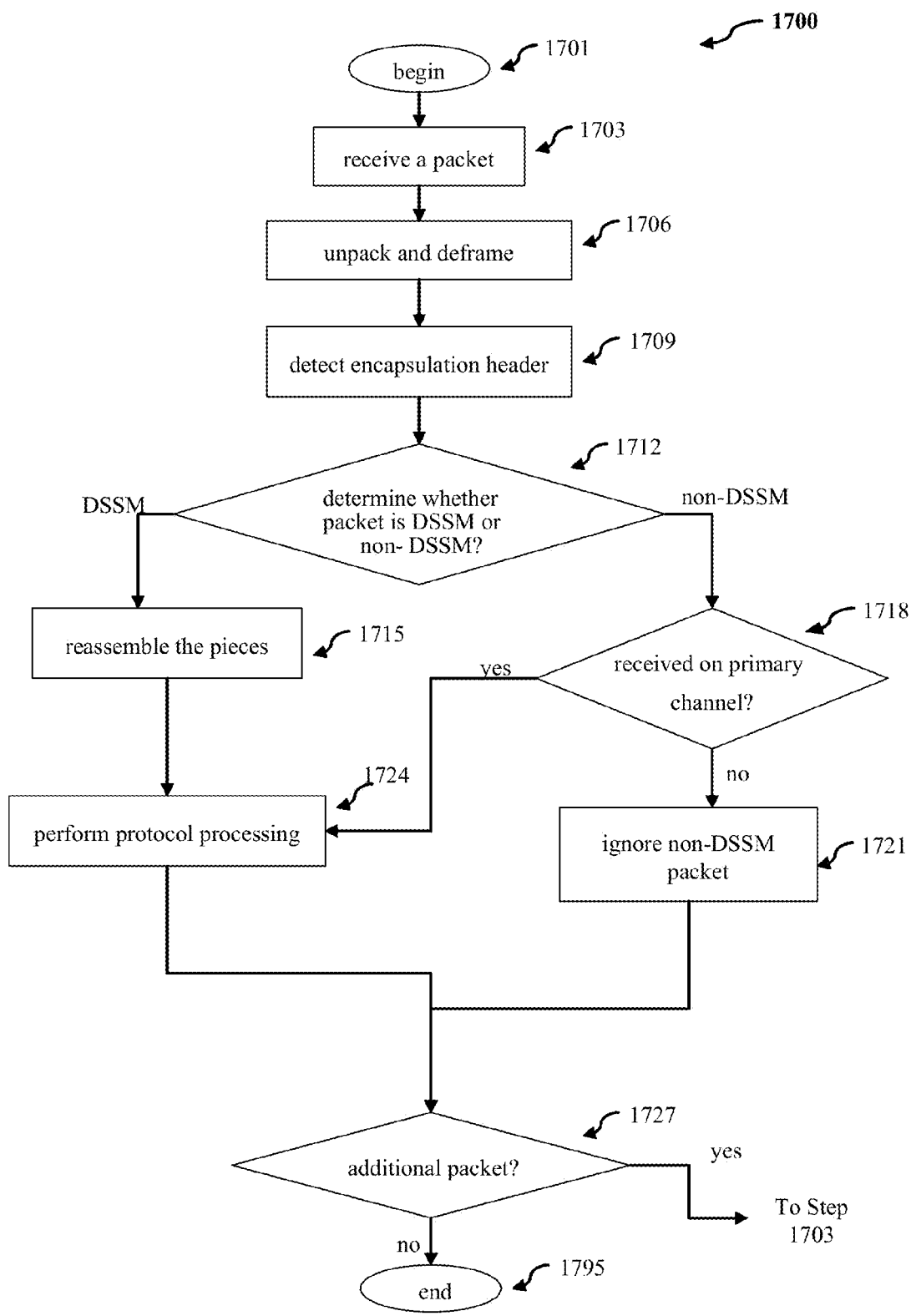
FIG. 17 illustrates an operational flow for receiving a downstream packet according to an embodiment of the present invention.

Upon transmission of the encapsulated DSSM or non-DSSM packet, the packet is received and processed by remote communications nodes 108. Referring to FIG. 17, flowchart 1700 represents the general operational flow of an embodiment of the present invention for receiving a downstream packet. More specifically, flowchart 1700 shows an example of a control flow for receiving a downstream packet at a DSSM-capable remote communications node 108a-108b. The invention, however, is not limited to the description provided by flowchart 1700. Rather, it will be apparent to persons skilled in the relevant art(s) from the teachings provided herein that other functional flows are within the scope and spirit of the present invention.

Flowchart 1700 will be described with continued reference to example communication system 100 described above in reference to FIG. 12, though the method is not limited to that embodiment.

The control flow of flowchart 1700 begins at step 1701 and passes immediately to step 1703. At step 1703, a packet is accessed from the one or more of the four downstream channels of internodal infrastructure 106. If the packet is a non-DSSM packet, the packet would arrive from one of the four downstream channels, as discussed in greater detail below.

If the packet is a DSSM packet (e.g., DSSM packet 1412), four pieces (e.g., pieces 1404a-1404d or 1504a-1504c) of the original packet (e.g., packet 1404) would arrive from the four downstream channels. Since the physical delay variation (e.g., group delay change) across four adjacent carriers is small (on the order of a symbol time), the four pieces arrive at the destined remote communications nodes 108 at substantially the same time. In other words, the four PHYs for a remote communications node 108 would independently receive four DSSM packet pieces at substantially the same time (to within a symbol period plus any variation introduced by the PHY implementations).

At step 1706, the packet is unpacked and deframed. At step 1709, the encapsulation header is detected. In an embodiment, a header parser detects the FC type field 1410, PID 1610, or the like, as discussed above.

At step 1712, it is determined whether the packet is a DSSM packet or a non-DSSM packet. In an embodiment using byte-level splitting, if the FC type field is set to 10, the packet is determined to be a DSSM packet, and the control flow passes to step 1715. In an embodiment using packet-level splitting, the packet is determined to be a DSSM packet if PID 1610 is set to any value other than "0x1FFF", and the control flow passes to step 1715. Otherwise, the packet is determined to be a non-DSSM packet, and the control flow passes to step 1718. Therefore, the present invention includes a mechanism for allowing, for example, a DSSM-capable cable modem to receive legacy packets.

At step 1715, the individual pieces (e.g., 1404a-1404d or 1504a-1504c) are reassembled with minimal buffering and no packet ordering problems. In an embodiment using byte-level splitting, a byte is pulled from the PDU of each channel in the order indicated by the FC_PARM bits (e.g., FC_PARM field 1414) to reconstruct the original packet (e.g., packet 1404). In an embodiment using packet-level spitting, the sequence number 1514 is utilized to reassemble the PDU into the original packet (e.g., packet 1404).

At step 1724, the resulting byte stream is sent to a MAC, within remote communications node 108, for protocol processing while it is being constructed. Therefore, there is no need to buffer the entire packet before sending it to the MAC. During protocol processing, HCS and CRC checking are performed on the reconstructed packet just as if it had been received on a single carrier, and the encapsulation header also gets its HCS checked. Any receiver errors (e.g., FEC errors) on any of the channels result in an HCS or CRC failure for the complete reconstructed frame, thus causing the entire frame to be dropped. If the CRC and HCS checks pass, the reconstructed frame continues to normal MAC layer processing, including, for example, header parsing, DES decryption, payload header suppression (PHS) expansion, and/or the like.

At step 1718, non-DSSM packets are processed by the DSSM-capable remote communications node 108a-108b. To limit buffering requirements and avoid the complexity of a "network-layer multichannel," a provisioning mechanism is provided to make one of the four downstream channels of remote communications node 108a-108b the "primary downstream" (e.g., the channel on which it listens for legacy packets that pass its SID and DA filters).

Thus, if the non-DSSM packet is received on the primary downstream channel, the control flow passes to step 1724, and the packet is sent to the MAC for protocol processing. Having the ability to receive legacy packets allows DSSM-capable cable modems to receive management messages in "legacy" format (i.e., no duplication of MAP or UCD messages is needed for the DSSM-capable cable modems versus earlier DOCSIS™ cable modems) and also listen in on multicast or broadcast streams intended for both legacy and DSSM-capable cable modems, which provides more statistical multiplexing benefits.

On the other hand if the non-DSSM packet is not received on the primary downstream channel, the control flow passes to step 1721. At step 1721, the non-DSSM packet is completely ignored.

At step 1727, if additional packets are received from the downstream, the control flow returns to step 1703, and the process is repeated. Otherwise, the control flow ends as indicated by step 1795.

Figure 18:
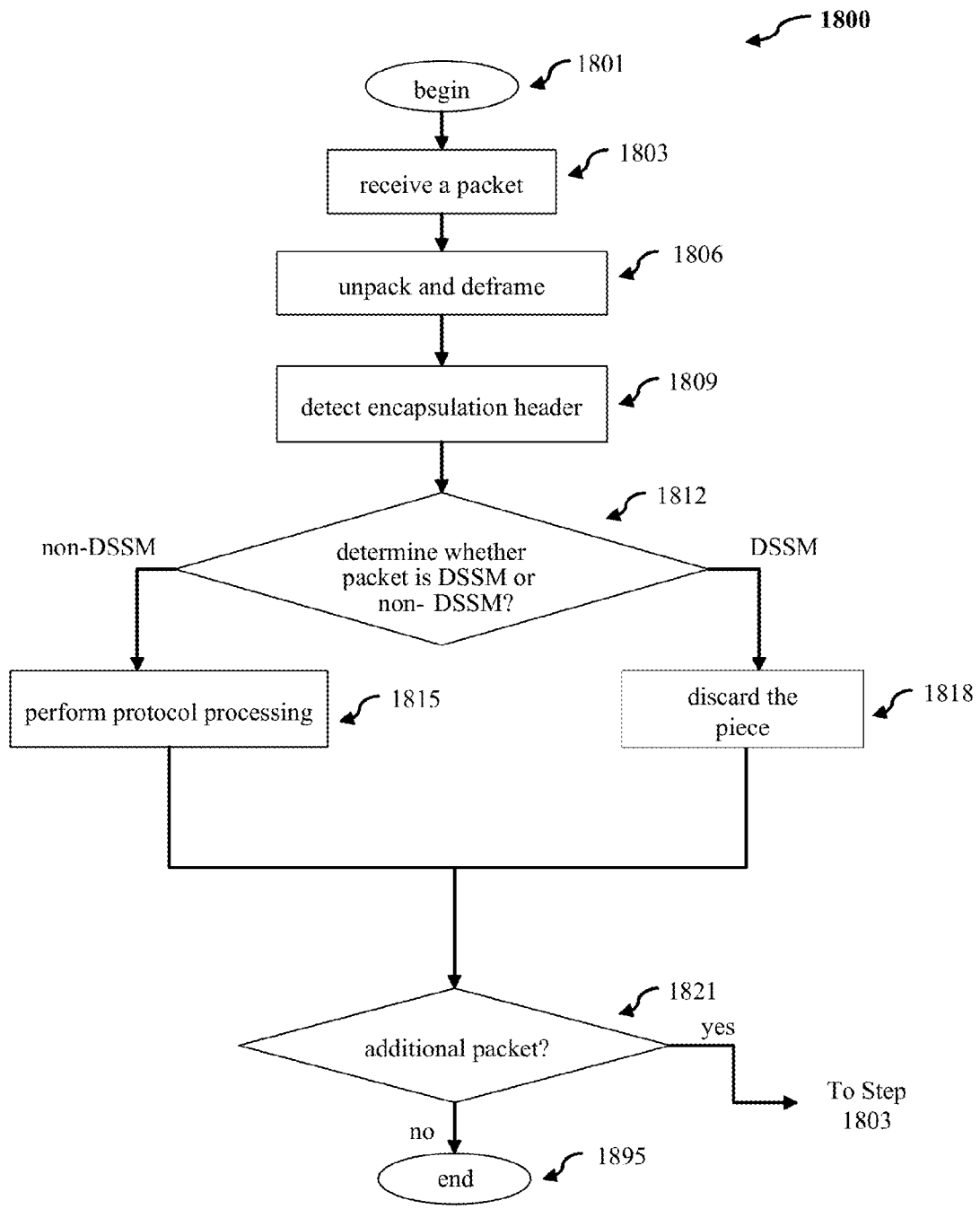
FIG. 18 illustrates an operational flow for receiving a downstream packet according to another embodiment of the present invention.

Referring to FIG. 18, flowchart 1800 represents the general operational flow of another embodiment of the present invention for receiving a downstream packet. More specifically, flowchart 1800 shows an example of a control flow for receiving a downstream packet at a non-DSSM-capable remote communications node 108c-108d. The invention, however, is not limited to the description provided by flowchart 1800. Rather, it will be apparent to persons skilled in the relevant art(s) from the teachings provided herein that other functional flows are within the scope and spirit of the present invention.

Flowchart 1800 will be described with continued reference to example communication system 100 described above in reference to FIG. 12, though the method is not limited to that embodiment.

The control flow of flowchart 1800 begins at step 1801 and passes immediately to step 1803. At step 1803, a packet is accessed from the downstream. At step 1806, the packet is unpacked and deframed. At step 1809, the encapsulation header is detected. At step 1812, it is determined whether the packet is a non-DSSM packet or a DSSM packet. If it is determined to be a non-DSSM packet, the control flow passes to step 1815. Otherwise, the control flow passes to step 1818.

At step 1815, protocol processing is performed on the non-DSSM packet. The protocol processing includes HCS and CRC checking, header parsing, DES decryption, PHS expansion, and/or the like.

At step 1818, the DSSM packet is silently discarded. As discussed above, the pieces (e.g., pieces 1404a-1404d or 1504a-1504c) are encapsulated with a header that marks the packet as being a DSSM packet (e.g., DSSM packet 1412). When a DSSM packet is received by a non-DSSM capable remote communications node 108c-108d and if byte-level splitting is used to produce the DSSM packet, the reserved FC type field 1410 instructs the remote communications node 108c-108d to use the LEN field 1420 of the encapsulation header to discard the entire DSSM packet. If packet-level splitting has been used to produce the DSSM packet, PID 1510 instructs the remote communications node 108c-108d to discard the entire DSSM packet. Discarding the DSSM packet avoids causing any trouble for, for example, a legacy cable modem. The legacy cable modem's PHY sees completely valid bits, so it continues to track, but these bits go directly to a bit bucket and do not affect the legacy cable modem's operation in any way.

At step 1821, if additional packets are received from the downstream, the control flow returns to step 1803, and the process is repeated. Otherwise, the control flow ends as indicated by step 1895.

As discussed above, the multiple pieces (e.g., pieces 1404a-1404d or 1504a-1504c) encapsulated as DSSM packets (e.g., DSSM packet 1412) arrive at the DSSM-capable remote communications nodes 108a-108b at substantially the same time. Any variation in the arrival time of the multiple pieces at their respective remote communications nodes 108a-108b translates directly into additional buffering space at the remote communications nodes 108a-108b. The present invention includes mechanisms for keeping any arrival time variation to a minimum. On identical downstream channels, this may be accomplished by requiring that MPEG frames, SYNC message location, and FEC frames be synchronized across the channels.

However, if the channels are not identical, several approaches are available for minimizing arrival time variation. First, differing modulation orders and baud rates would make it difficult to synchronize MPEG frames across channels. From the point of view of the "reconstruction" function of the DSSM-capable remote communications node 108a-108b, this means that MPEG headers would "interrupt" the received byte streams from the different channels at different times. This could be overcome by adding sufficient buffering to take up the resulting variation. Since the MPEG header is only four or five bytes, this solution is generally acceptable.

Second, differing modulation orders and baud rates would also prohibit perfect synchronization of SYNC messages across the downstream channels, since the message would take a different amount of time to send on different channels. In addition, since SYNC messages are not allowed to cross MPEG frame boundaries, it may be difficult for headend 102 to find a time when it is possible to start a SYNC message on all four channels at once. A SYNC message is thirty-four (34) bytes long, so the buffering needed on each downstream channel to take up this variation would be about that size.

Third, different modulation orders also call for slightly different FEC framing structures, which cannot be synchronized across downstream channels. Fortunately, the resulting variation in arrival time is still relatively small (84 bits at a time is the maximum) so adding buffering is probably a viable solution.

Fourth, if the interleaver settings are not identical across channels, the delay variation may be significant (on the order of several milliseconds, or more if more interleaver depth is added to support 1024-QAM, for example). This variation may be far too large to be addressed by buffering at the remote communications node 108a-108b. One solution is to account for it at the "splitting" function of the headend 102 by "offsetting" the transmission time of the pieces so that their arrival time at the remote communications node 108a-108b is almost identical. This works great for the receiver side (i.e., remote communications node 108a-108b), but requires some architectural adjustments at the supervisory communications node 108 to deal with the pipeline issues resulting from "splitting" a DSSM packet and then having to "hold" one or more pieces while other packets are transmitted on some channels. Carefully reordering the steps at the headend 102 can address this problem or the headend 102 can use large buffers to provide the necessary delays.

Figure 13:
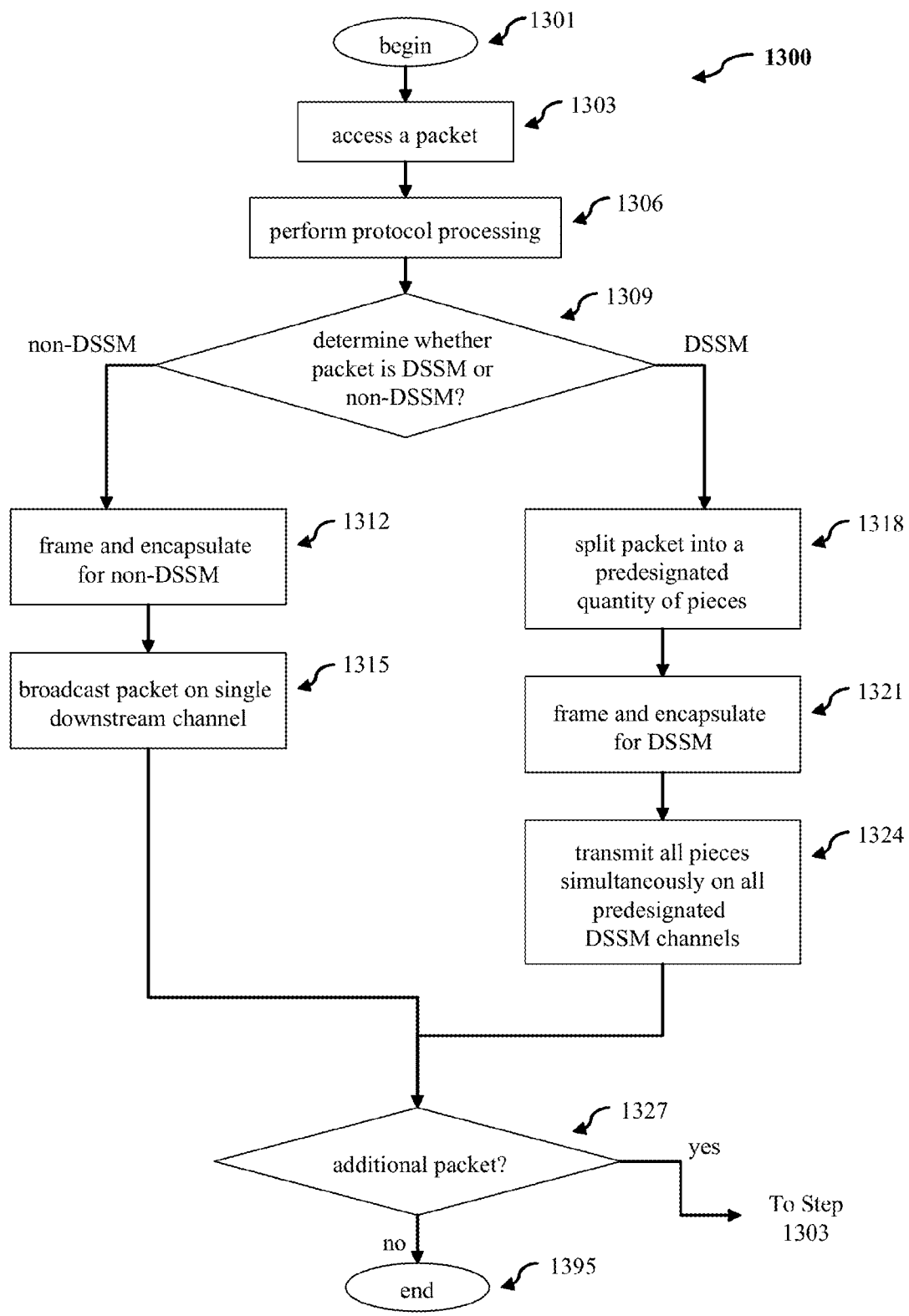
FIG. 13 illustrates an operational flow for transmitting downstream packets according to an embodiment of the present invention.
Figure 19:
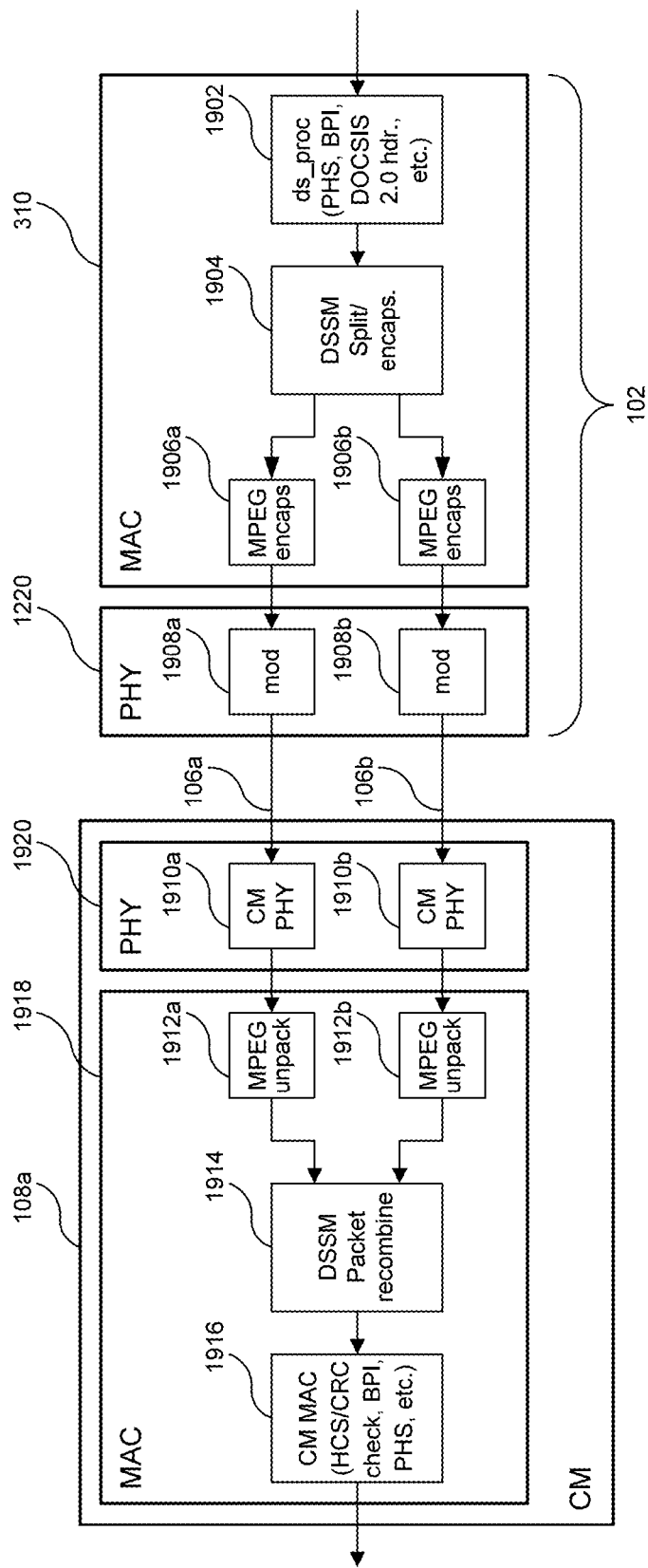
FIG. 19 illustrates a communication system according to another embodiment of the present invention.

The control flows of FIGS. 13 and 17 can also be explained with reference to FIG. 19. More specifically, FIG. 19 illustrates an embodiment of a DSSM-capable remote communications node 108a, and a DS PHY 1220 and a MAC 310 from supervisory communications node 108. FIG. 19 also shows two downstream channels 106a-106b from headend 102 to the DSSM-capable remote communications node 108a. Although only two channels are shown, as discussed above, the quantity of channels may be more or fewer as desired by the system architect. Also, as discussed, one downstream channel may be a primary channel for receiving non-DSSM packets.

FIG. 19 shows various components of headend 102 and the DSSM-capable remote communications node 108a for sending and receiving DSSM packets and non-DSSM packets in accordance with an embodiment of the present invention. As shown, MAC 310 includes a downstream protocol processor 1902, a packet divider 1904, and two encapsulators 1906a-1906b. Downstream protocol processor 1902 performs protocol processing on packets received for the downstream. As discussed above with reference to step 1306, protocol processing includes payload header suppression, DES encryption, and/or the like.

Upon completion of protocol processing, packet divider 1904 takes the resulting packet (e.g., packet 1404) and splits the packet into a predesignated quantity of pieces (e.g., pieces 1404a-1404d, 1504a-1504c), as discussed above with reference to step 1318. The predesignated quantity of pieces matches the quantity of available downstream channels of internodal infrastructure 106. Since only two downstream channels 106a-106b are shown in FIG. 19, packet divider 1904 would perform byte-level splitting, packet-level splitting, or the like to produce the two pieces.

Encapsulators 1906a-1906b frame and encapsulate the pieces, as discussed above with reference to step 1321. Encapsulator 1906a is dedicated to downstream channel 106a, and encapsulator 1906b is dedicated to downstream channel 106b. Therefore if packet divider 1904 produces and assigns a piece to downstream channel 106a, encapsulator 1906a would create an encapsulation header to mark the piece for transmission over channel 106a. Likewise if packet divider 1904 produces and assigns a piece to downstream channel 106b, encapsulator 1906b would create an encapsulation header to mark the piece for transmission over channel 106b.

DS PHY 1220 includes DS PHY 1908a and DS PHY 1908b, which form the physical layer interface between headend 102 and downstream channels 106a and 106b, respectively. Packets from encapsulators 1906a-1906b are collected at PHY 1908a-1908b, respectively, and converted to a physical signal.

The physical signal is received at PHY 1920, which forms the physical layer interface between the DSSM-capable remote communications node 108a and downstream channels 106a and 106b. PHY 1920 includes PHY 1910a, which receives physical signals from downstream channel 106a, and PHY 1910b, which receives physical signals from downstream channel 106b. As discussed with respect to step 1703, multiple pieces (e.g., pieces 1404a-1404d, or 1504a-1504c) of an original packet (e.g., packet 1404) are independently received at PHY 1910a-1910b at substantially the same time.

The DSSM-capable remote communications node 108a also includes a MAC 1918 that receives the downstream signals from PHY 1920, and extracts voice, data, requests, and/or the like. MAC 1918 includes two deframers 1912a-1912b, packet recombiner 1914, and protocol processor 1916. Deframer 1912a is dedicated to downstream channel 106a, and deframer 1912b is dedicated to downstream channel 106b. As such, deframer 1912a receives, unpacks, and deframes packets that are received from PHY 1910a, and deframer 1912b receives, unpacks, and deframes packets that are received from PHY 1910b.

Packet recombiner 1914 receives packets from deframers 1912a-1912b and reassembles the pieces. As discussed at steps 1706-1715, packet recombiner 1914 parses the encapsulation headers to reconstruct the original packet (e.g., packet 1404) from the individual pieces (e.g., 1404a-1404b, 1504a-1504c).

Protocol processor 1916 receives the resulting packet from packet recombiner 1914, and performs protocol processing, as discussed at step 1724. In an embodiment, a byte stream from packet recombiner 1914 is delivered to protocol processor 1916, while the packet is being reconstructed. This eliminates the need to buffer the entire packet before sending it to protocol processor 1916.

It should be noted that the splitting (as performed by packet divider 1904) and reassembly (as performed by packet recombiner 1914) of the pieces take place right before and after, respectively, the MPEG framing (as performed by encapsulators 1906a-1906b and deframer 1912a-1912b). As a result, the protocol processor 1916 sees a single input stream. In an embodiment using packet-level splitting, the splitting and encapsulating (e.g., framing and/or deframing) may be performed by the same component instead of two separate components as illustrated in FIG. 19.

As discussed above with reference to steps 1718-1724, the DSSM-capable remote communications node 108a may also receive and process non-DSSM packets. To implement this capability, downstream channel 106a may be designated as being the primary channel, such that only non-DSSM packets received on channel 106a are accepted. Non-DSSM packets received on channel 106b are ignored. A non-DSSM packet received at packet divider 1904 is not split into pieces, but passed onto encapsulator 1906a. Encapsulator 1906a would create an encapsulation header that marks the packet as being a non-DSSM packet. PHY 1908a would pass a physical signal embodying the packet to PHY 1910a. PHY 1910a would receive the physical signal, and deliver the non-DSSM packet to deframer 1912a. Deframer 1912a unpacks and deframes the non-DSSM packet, and packet recombiner 1914 would parse the encapsulation header that identifies it as being a non-DSSM packet. As such, packet recombiner 1914 would pass the non-DSSM packet to protocol processor 1916.

2.2.2 Scheduling

In an embodiment of the present invention, a mechanism is provided to efficiently "schedule" the transmission of non-DSSM packets (e.g., legacy packets) around DSSM packets. As discussed with reference to FIG. 12, internodal infrastructure 106 includes four downstream channels. In and embodiment, transmitting a DSSM packet requires the use of all four channels. Therefore, the timing of DSSM transmissions affects the availability of a channel for non-DSSM-capable remote communications nodes 108c-108d on all four channels. This leads to a "scheduling" problem within headend 102 in determining when to transmit which type of packet.

Figure 20:
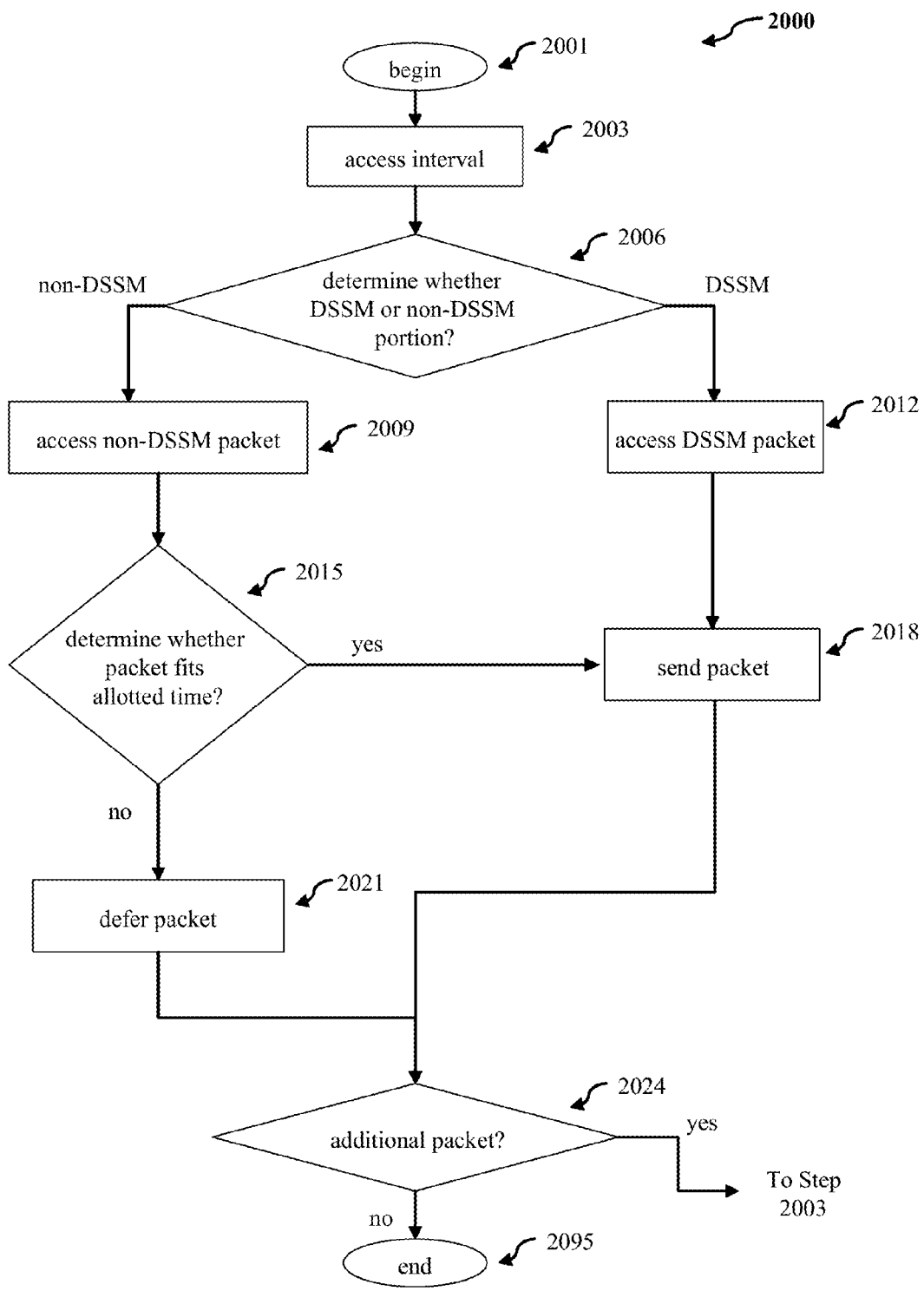
FIG. 20 illustrates an operational flow for downstream scheduling according to an embodiment of the present invention.

Referring to FIG. 20, flowchart 2000 represents the general operational flow of an embodiment of the present invention for downstream scheduling. More specifically, flowchart 2000 shows an example of a control flow for using MAP intervals to schedule the downstream. The invention, however, is not limited to the description provided by flowchart 2000. Rather, it will be apparent to persons skilled in the relevant art(s) from the teachings provided herein that other functional flows are within the scope and spirit of the present invention.

Flowchart 2000 will be described with continued reference to example communication system 100 described above in reference to FIG. 12, though the method is not limited to that embodiment.

The control flow of flowchart 2000 begins at step 2001 and passes immediately to step 2003. At step 2003, the interval parameters are accessed for defining MAP intervals for the downstream. In an embodiment, a "MAP-like" structure is imposed on the downstream within headend 102, only. There is no need to transmit a downstream MAP to remote communications nodes 108a-108d, because the encapsulation header, discussed above, automatically lets the remote communications nodes 108a-108d know what type of packet it is receiving. Therefore, the downstream MAP is a conceptual tool to be used to think about how to partition downstream bandwidth.

Using this concept, the downstream may be thought of as being broken into a series of "MAP intervals," which are probably best imagined as of fixed duration—perhaps some interval relating to common VOIP packetization (e.g., 5 or 10 milliseconds). Each MAP interval is divided into two "chunks": one for non-DSSM transmissions and one for DSSM transmissions. The relative size of these allocations may be changed from interval to interval, but each "chunk" always is contiguous (i.e., the first X % of the interval is devoted to non-DSSM-capable remote communications nodes 108c-108d, then the remaining (100-X) % is used for DSSM transmissions). It is also possible to allocate 100% of the channel to DSSM-capable remote communications nodes 108a-108b. If so configured, headend 102 would ignore "interval" boundaries and send DSSM packets all the time.

As such, at step 2003, a software application (e.g., software application 1230) at headend 102 would determine the MAP "interval" from the aforementioned interval parameters (e.g., interval duration, chunk percentage, etc.), and program it into MAC 310. The units may be timestamp counts or a similar convenient reference. Rate-shaping software (at, for example, software application 1230) would let MAC 310 know on a regular basis (perhaps via an in-line "management message" as part of the data flow) what fraction of an interval to devote to each type of traffic.

Once the interval starts, it is determined, at step 2006, whether the DSSM or non-DSSM portion of the interval is present. If the interval is currently in the non-DSSM portion, the control flow passes to step 2009.

At step 2009, a non-DSSM packet (e.g., legacy packet) is accessed and examined for transport over a primary channel. At step 2015, it is determined whether the packet fits in the allotted time. If the packet fits the allotted time, then at step 2018, the packet is sent over the appropriate channel. If there is not enough time remaining in the "non-DSSM fraction" of the interval to send the non-DSSM packet, then at step 2021, the packet is deferred until the start of the next non-DSSM interval.

At step 2024, the next packet is fetched and steps 2006, 2009, and 2015-2021 are repeated if additional non-DSSM packets are available. If no additional packets are available, the control flow ends as indicated by step 2095 until the DSSM portion of the interval begins.

Once the DSSM portion of the interval begins at step 2006, the control flow passes to step 2012. At step 2012, a DSSM packet is accessed and divided into pieces for transport over all available downstream channels. At step 2018, the packet pieces are sent over the multiple downstream channels. At step 2024, the next packet is fetched and steps 2006, 2012, and 2018 are repeated if additional DSSM packets are available. If no additional packets are available, the control flow ends as indicated by step 2095 until the non-DSSM portion of the interval begins.

To increase efficiency, "fragmentation" is introduced, in an embodiment, into the DSSM downstream, so that if the next DSSM packet in the queue cannot be transmitted by the end of the interval, the first part of it can be transmitted and the remainder sent during the next interval. This would guarantee that none of the "DSSM chunk" of the interval is wasted.

In an embodiment, the rate-shaping software (e.g., software application 1230) adjusts the interval proportions based on monitoring of queue depths, knowledge of bandwidth allocated to admitted flows on remote communications nodes 108a-108d of each type (e.g., make sure there is enough legacy time to carry all active phone calls on these devices), and other system parameters.

Figure 21:
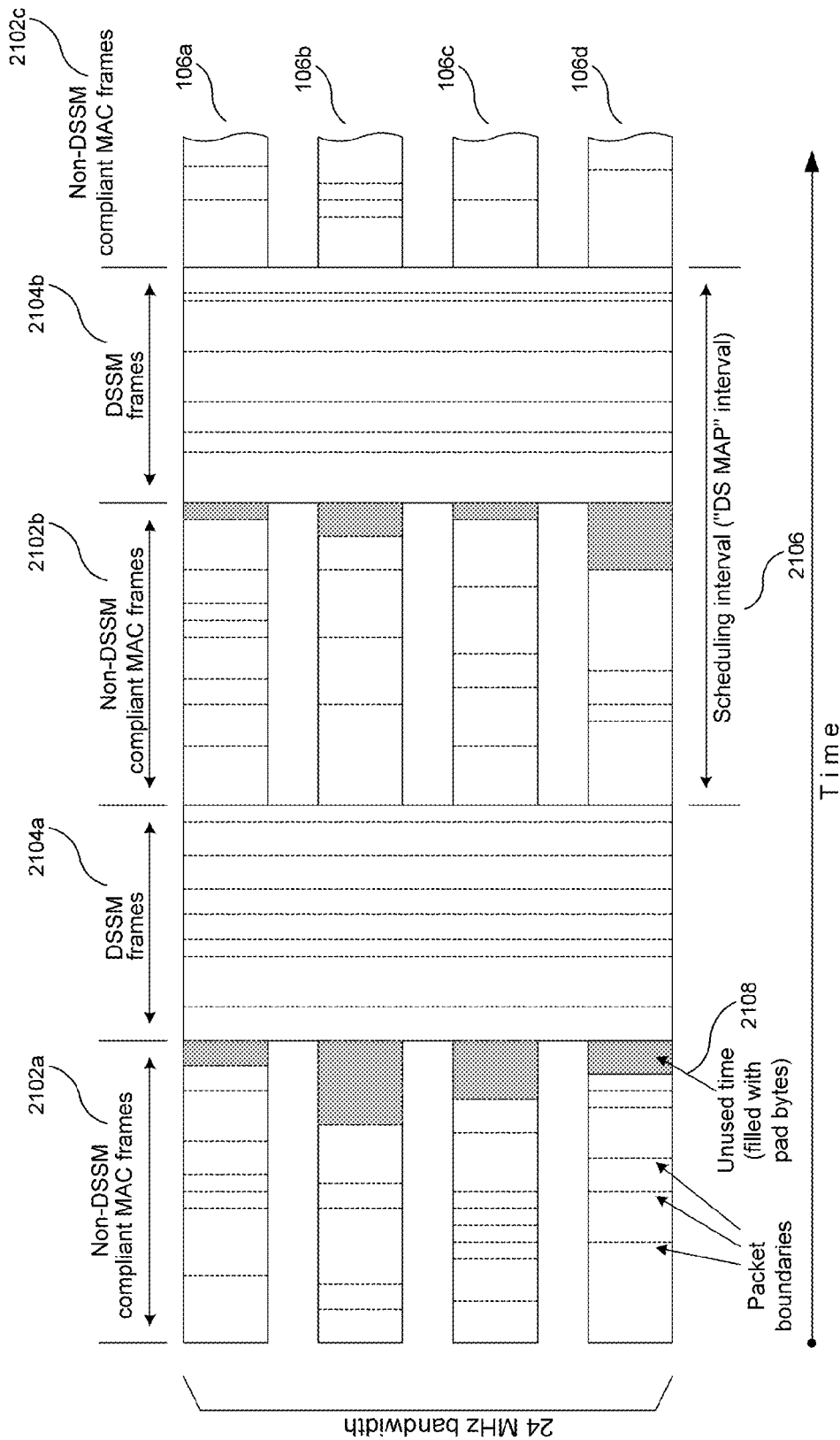
FIG. 21 illustrates the scheduling of non-DSSM and DSSM packets, according to an embodiment of the present invention.

FIG. 21 illustrates the combining of non-DSSM and DSSM packets according to an embodiment of the present invention. As discussed, a scheduling interval 2106 includes a non-DSSM portion 2102 (shown as 2102a-2102c) and a DSSM portion 1004 (shown as 2104a-2104b). As shown, DSSM portions 2104a-2104b of the scheduling interval 2106 are used to send four pieces of a packet over the four available downstream channels 106a-106d. Non-DSSM portions 2102a-2102c are used to schedule the transmission of non-DSSM packets, such as legacy packets. Any unused time 2108 on a downstream channel 106a-106d may be filled with pad bytes.

Figure 24:
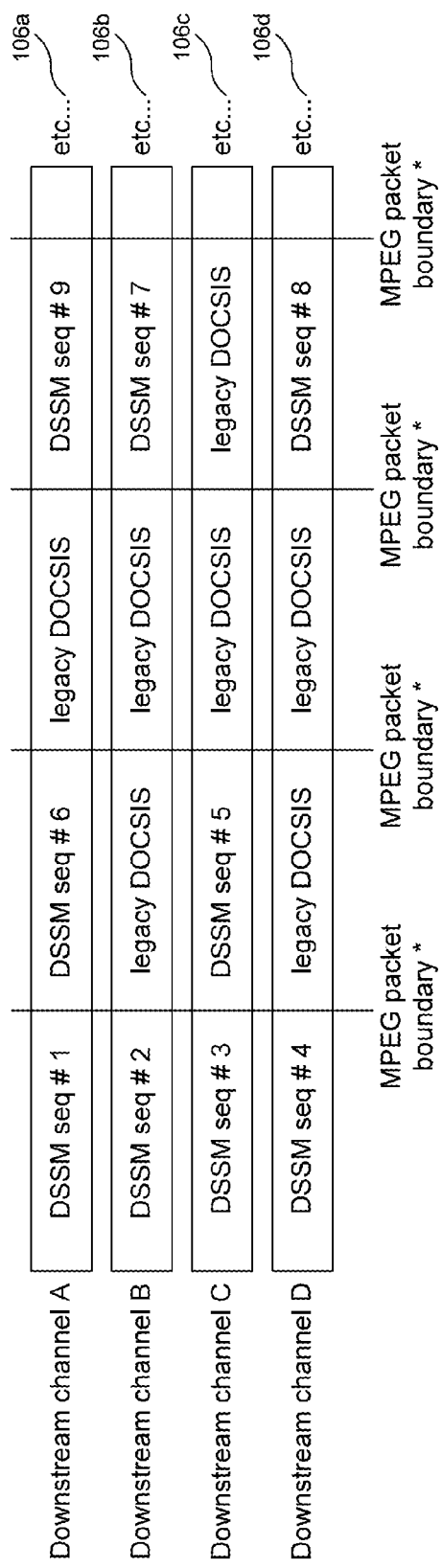
FIG. 24 illustrates the scheduling of non-DSSM and DSSM packets, according to another embodiment of the present invention.

In an embodiment, for instance, when packet-level splitting is used per FIG. 15, legacy and DSSM traffic may be combined such that during a given time interval, some channels may be carrying DSSM traffic while other channels are carrying legacy traffic. FIG. 24 illustrates this approach. In the illustration, a "scheduling interval" corresponds to the duration of one MPEG packet. Within a scheduling interval, the headend (e.g., headend 102) may choose to transmit DSSM data on some, all, or none of the available channels, and may choose to send legacy data on those channels not carrying DSSM data. In an embodiment, this decision may be made based on relative data priority, queue size, or any of a number of other considerations.

As discussed, using "MAP-like" structures is one approach to efficiently scheduling transmissions of non-DSSM packets around DSSM packets over the same downstream channels. In another embodiment, scheduling is based on the dynamic use of downstream channels on a per-packet basis. For example, a given DSSM packet may be divided among two, three, or all four downstream channels. The next packet may be divided among a different number of channels and/or use the channels in a different order, and the next could be different still, and so forth.

Figure 22:
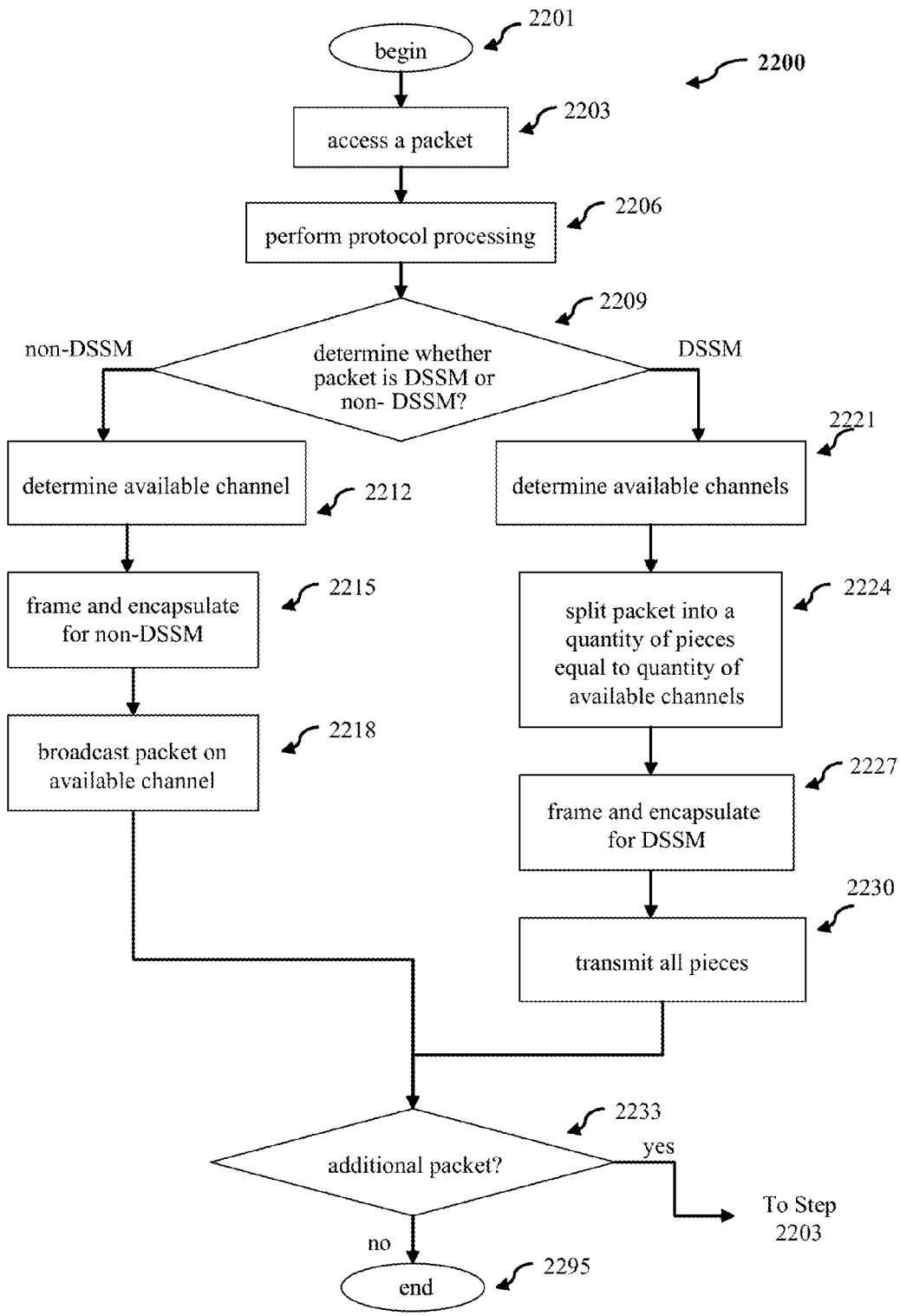
FIG. 22 illustrates an operational flow for dynamic downstream scheduling according to an embodiment of the present invention.

Referring to FIG. 22, flowchart 2200 represents the general operational flow of another embodiment of the present invention for downstream scheduling. More specifically, flowchart 2200 shows an example of a control flow for dynamically scheduling the downstream. The invention, however, is not limited to the description provided by flowchart 2200. Rather, it will be apparent to persons skilled in the relevant art(s) from the teachings provided herein that other functional flows are within the scope and spirit of the present invention.

Flowchart 2200 will be described with continued reference to FIG. 21, to MAC-layer packet formats described above in reference to FIG. 14, and to example communication system 100 described above in reference to FIG. 12, though the method is not limited to these embodiments.

The control flow of flowchart 2200 begins at step 2201 and passes immediately to step 2203. At step 2203, a packet is accessed for downstream transmission. At step 2206, protocol processing is performed on the packet as discussed above. At step 2209, it is determined whether the packet is a DSSM packet or a non-DSSM packet. If the packet is determined to be a non-DSSM packet, the control flow passes to step 2212. If, on the other hand, the packet is determined to be a DSSM-packet, the control flow passes to step 2221.

At step 2212, it is determined which channel the non-DSSM packet will be sent and whether that channel is available for broadcasting the non-DSSM packet. In an embodiment, the packet is held until that channel becomes available.

At step 2215, the non-DSSM packet is framed and encapsulated with a non-DSSM encapsulation header, as discussed above. At step 2218, the non-DSSM packet is broadcast over the selected channel to remote communications nodes 108a-108b and to remote communications nodes 108c-108d as may be on the selected channel, and at step 2233, it is determined whether additional packets are available.

At step 2221, the available downstream channels are determined for sending a DSSM packet. At step 2224, the packet is split into the same number of pieces as there are available channels. For example, if only two of the four downstream channels 106a-106d (shown in FIG. 21) are determined to be available at step 2221, the packet from step 2203 is divided into two pieces at step 2224.

In an embodiment discussed above, a "channel number" is provided in the FC_PARM field 1414 of the encapsulation header for each piece. The channel number is also referred to as a "piece number," with piece number 0, 1, 2, 3 indicating the order in which bytes are to be reassembled. One more bit is added to the header as a "last piece" flag which tells the receiving remote communications node 108a-108b how many pieces the packet got divided into and hence how many channels are being used. Therefore, if the packet has been divided into two pieces, the first piece is denoted as "piece 0" and the second piece is denoted as "piece 1," and the "last piece" flag is set in piece 1 to indicate that only two pieces are being used.

At step 2230, the two pieces are sent on the two available downstream channels, and at step 2233 it is determined whether additional packets are available. If additional packets are available, the control flow returns to step 2203. Otherwise, the control flow ends as indicated by step 2295.

If at step 2221, it is determined that all four downstream channels 106a-106d are available for sending the next DSSM packet, the packet is broken into pieces number 0, 1, 2, and 3, and the "last piece" bit is set on piece 3. Thus, the receiving DSSM-capable remote communications node 108a-108b may detect "on the fly" how many channels are being used for a given packet, and any combination of the four channels may be used in any order. As such, the present invention enables dynamic channel usage on a per-packet basis for DSSM packets.

The present invention also implements the concept of downstream fragmentation. As opposed to "pieces," which are sent simultaneously on all channels, "fragments" are separated in time. At headend 102, "fragmentation" occurs before division into "pieces." For example, the DOCSIS™ 2.0 PDU may be separated into say two fragments. The first fragment may be divided into pieces with each piece having its own encapsulation header. These pieces are transmitted at the same time on two downstream channels. Some intervening time interval may pass, perhaps so that some legacy packets may be sent (but not other DSSM packets). Following the intervening time interval, the second fragment is divided into pieces with their own encapsulation headers. These pieces are also transmitted over the available downstream channels. It should be understood, however, that the downstream fragmentation of the present invention does not require the ability to send legacy packets between fragments.

Since DSSM fragments must be sent in order and all fragments for one DSSM packet must be sent before starting the next, only two bits are needed in the encapsulation header: one that says "this is a fragment" and one that says "this fragment is the last fragment." These bits would be included (and be identical) on all "pieces" of the fragment. If any fragments are lost, the reassembled packet would fail CRC and HCS, so a sequence number with checking is not necessary. To minimize overhead, the necessary two bits may be put in the FC_PARM field 1414. If more bits turn out to be necessary, an EHDR (e.g., EHDR field 1416) may be used, which may increase the overhead.

If non-DSSM packets are not supported between DSSM fragments, the receiving remote communications node 108a-108b reconstructs the pieces as usual, and it is not necessary for headend 102 to signal an "end-of-packet" on fragments until it finishes processing a fragment with the "last" flag set. If, on the contrary, non-DSSM packets between fragments are supported, the receiving remote communications node 108a-108b needs the ability to save a "state" while it processes a DSSM packet, process a non-DSSM packet, and then restore the saved state so that it may resume the processing of the DSSM packet.

Figure 23A:
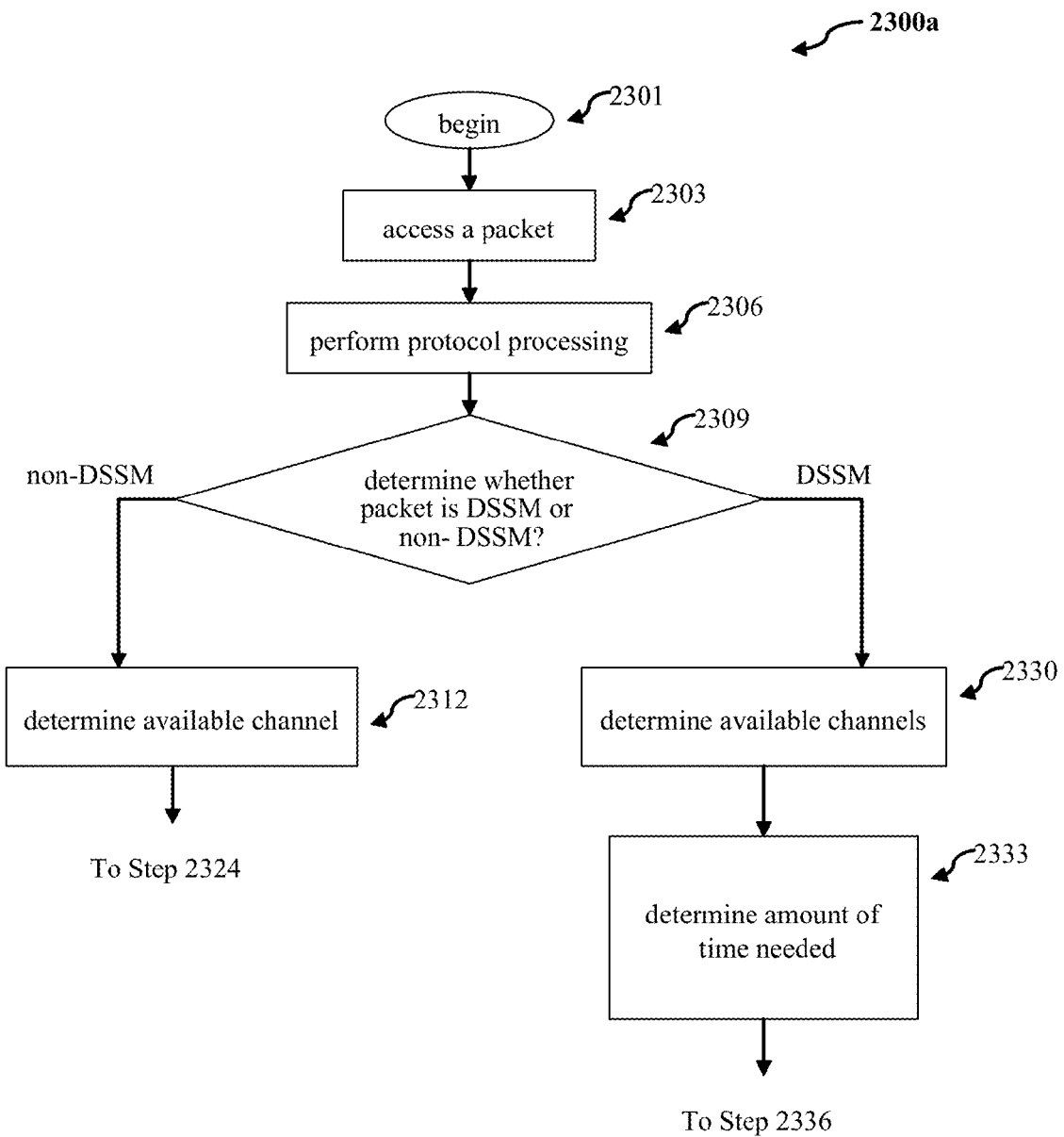
FIGS. 23a-23c illustrate an operational flow for dynamic downstream scheduling according to another embodiment of the present invention.
Figure 23B:
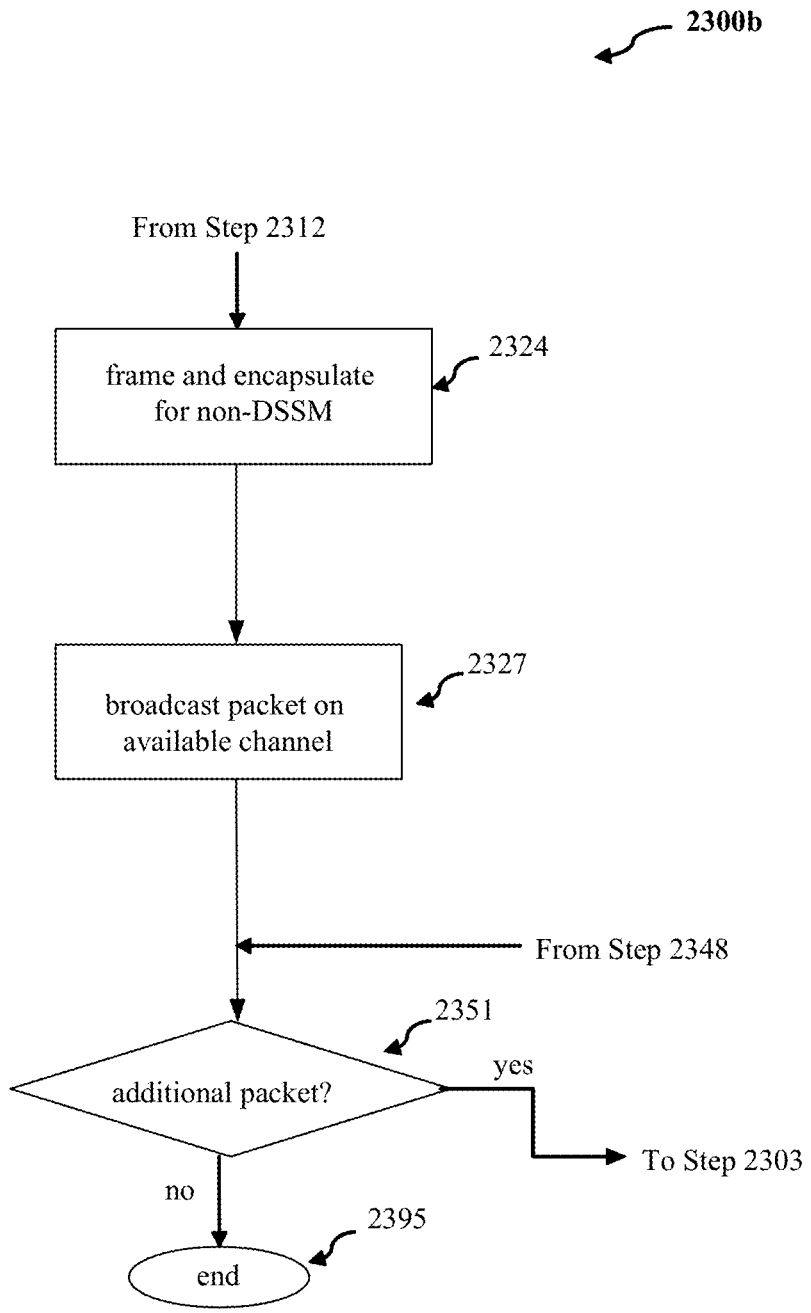
Figure 23C:
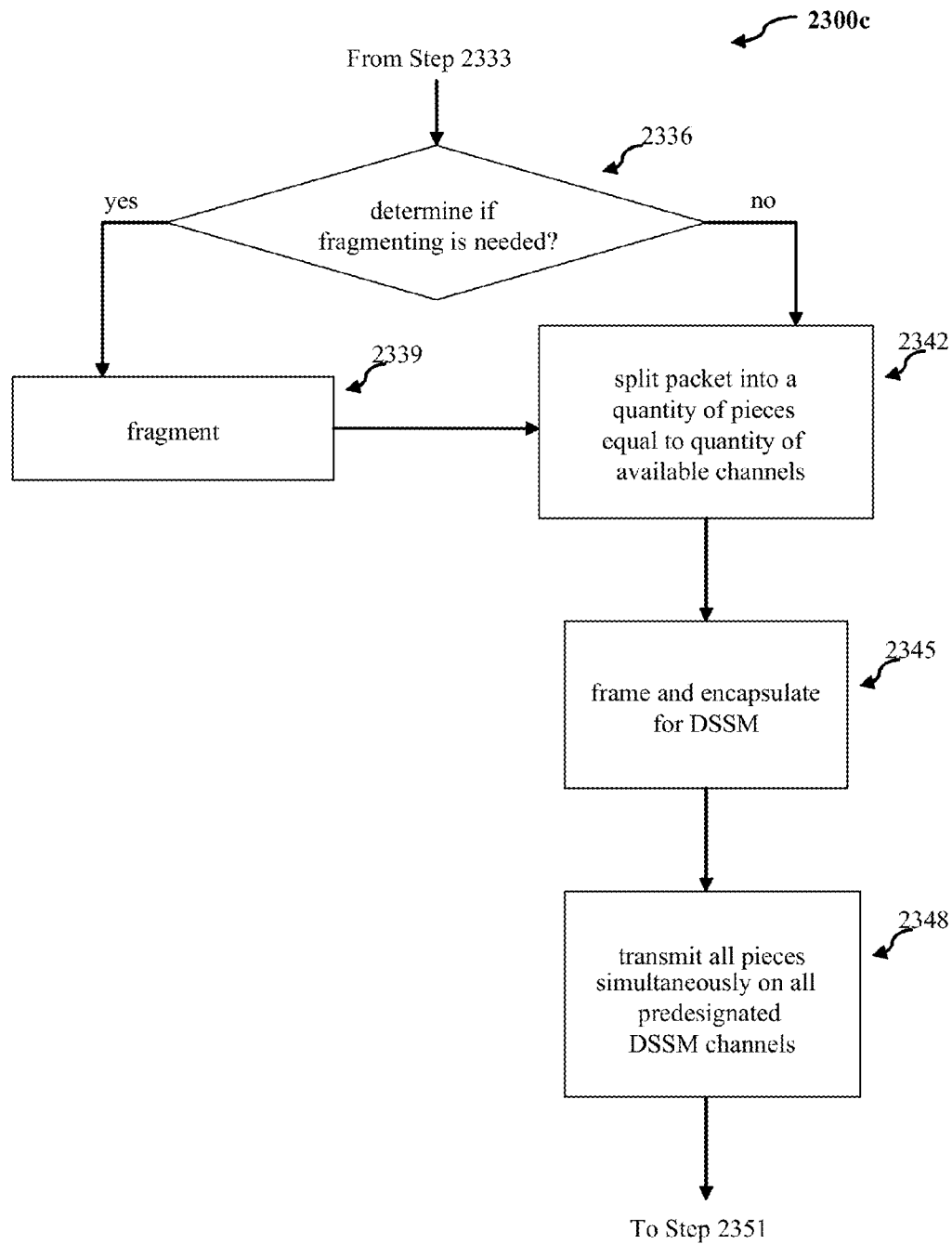

Referring to FIGS. 23a-23c, flowchart 2300 (shown as 2300a-2300c) represents the general operational flow of another embodiment of the present invention for downstream scheduling. More specifically, flowchart 2300 shows an example of a control flow for dynamically scheduling the downstream with fragmentation. The invention, however, is not limited to the description provided by flowchart 2300. Rather, it will be apparent to persons skilled in the relevant art(s) from the teachings provided herein that other functional flows are within the scope and spirit of the present invention.

Flowchart 2300 will be described with continued reference to example communication system 100 described above in reference to FIG. 12, though the method is not limited to that embodiment.

The control flow of flowchart 2300 begins at step 2301 and passes immediately to step 2303. At step 2303, a packet is accessed for downstream transmission. At step 2306, protocol processing is performed. If at step 2309, the packet is determined to be a non-DSSM packet, the control flow passes to step 2312. Otherwise, at step 2309, the control flow for a DSSM packet passes to step 2330.

At step 2312, it is determined which channel the non-DSSM packet is to be sent and whether that downstream channel is available for sending the non-DSSM packet. In an embodiment, the packet is held until that channel is available.

At step 2324, the packet is framed and encapsulated as a non-DSSM packet. At step 2327, the packet is broadcast to all remote communications nodes 108. At step 2351, the control flow is returned to step 2303 if additional packets are available.

If at step 2309, a DSSM packet is detected, the control flow passes to step 2330. At step 2330, it is determined which downstream channels are available for the DSSM packet. At step 2333, it is determined how much time is needed to send the packet if it was split into a quantity of pieces matching the quantity of available channels. For example, if two channels are available, it is determined how much time is needed to send two pieces.

Based on the amount of time needed, it is determined at step 2336 whether fragmentation is necessary to send the packet after it is subsequently divided into the predetermined quantity of pieces (i.e., matching the quantity of available downstream channels). If there is sufficient time to send the packet pieces (unfragmented) over the available downstream channels, the packet is divided into the predetermined quantity of pieces at step 2342. At step 2345, each piece is framed and encapsulated with its own encapsulation header marking the piece as a DSSM packet. At step 2348, all packet pieces are sent simultaneously on the available downstream channels to the remote communications nodes 108. At step 2351, the control flow is returned to step 2303 if additional packets are available.

If, at step 2336, it is determined that there is insufficient time to send the packet pieces (unfragmented) over the available downstream channels, the packet is fragmented at step 2339. At step 2342, the first fragment is divided into the predetermined quantity of pieces. At step 2345, the pieces are framed and encapsulated, and at step 2348, all pieces are sent simultaneously on the available downstream channels. At step 2351, the control flow returns to step 2303 so that the remaining fragment(s) may eventually be sent. In an embodiment, if an intervening non-DSSM packet has been scheduled for a downstream channel, the remaining fragment(s) are either sent after the intervening non-DSSM packet, or divided at step 2342 into a lesser quantity of pieces for transmission over the downstream channels that are presently available. Otherwise, the control flow would skip 2330 and the remaining fragment is sent immediately unless additional fragmenting is required.

For example, assume that headend 102 would like to send a DSSM packet. Referring to FIG. 23*a* at step 2330, it may decide that channels B and C are open, but channels A and D are in the middle of transmitting non-DSSM packets. Further assume that channels B and C both allow 64 byte times to complete a transmission.

Therefore, at step 2339, the DSSM packet is fragmented so that the first fragment would contain 116 bytes of data. Then, at step 2342, the first fragment is divided into two pieces (each of which turns out to be 64 bytes long after encapsulation) and, at step 2348, the two pieces are sent on channels B and C.

Further assume that at the moment that transmission of the first fragment completes on channels B and C, the non-DSSM transmissions on channels A and D also are completed. Now, all four channels are determined to be available at step 2330. So, at step 2342, the second fragment of the DSSM packet is divided into four pieces, and at step 2348, the four pieces are sent on all four downstream channels.

If, thereafter, at step 2312, a high-priority legacy packet needs to be sent on channel A, then after the DSSM packet completes, the legacy packet could broadcast on downstream channel A at step 2327, while channels B, C, and D could be used to carry the next DSSM packet at step 2348. Once all packets have been transmitted, the control flow ends as indicated by step 2395.

Thus, the present invention allows all four downstream channels to stay completely full at all times. It also enables headend 102 (via, e.g., software application 1230) to specify that certain DSSM packets should only use certain channels. Headend 102 may enable or disable the use of certain channels for DSSM at certain times (e.g., it may be configurable to reserve one millisecond out of every five milliseconds for, e.g., legacy voice traffic on channel A only, or any other desired configurations).

At the receiving remote communications nodes 108, the present invention combines dynamic channel usage and fragmentation to use space on each channel as available, without the requirement that all channels must be "cleared" of non-DSSM packets before a DSSM packet can begin. With fragmentation, part of the packet may be sent over a smaller number of channels than the rest of the packet.

2.2.3 Management/OSS

In order for the communication system 100 of the present invention to be (a) backwards compatible, and (b) usable, it must be manageable. For example, in the embodiment of FIG. 12, DSSM-capable remote communications nodes 108*a*-108*b* must be able to determine what mode to operate, advertise their capabilities, and understand which channels to use.

According to an embodiment, a DSSM-capable remote communications nodes 108*a*-108*b* operates similarly to a DOCSIS™ 2.0 cable modem up to a particular point (i.e., scanning, upstream channel descriptor (UCD) selection, SYNC, ranging, dynamic host configuration protocol (DHCP), time of day (ToD) server, trivial file transfer protocol (TFTP)). During DHCP, the DSSM-capable remote communications nodes 108*a*-108*b* would advertise DSSM support in Option 60.

The DSSM-capable remote communications nodes 108*a*-108*b* then sends a REG-REQ message to the headend 102, just as a DOCSIS™ 2.0 modem would, but it advertises DSSM support in the REG-REQ message as well (e.g., in the modem capabilities type/length value (TLV) tuple). A non-DSSM-capable headend 102 would ignore the setting and return a normal REG-RSP. The DSSM-capable remote communications nodes 108*a*-108*b* would send a REG-ACK, start baseline privacy interface (BPI) and operate in a non-DSSM mode (e.g., legacy mode).

A DSSM-capable headend 102 would see the setting in the REG-REQ, and send TLVs in the REG-RSP telling the DSSM-capable remote communications nodes 108*a*-108*b* where the additional downstream frequencies are. The DSSM-capable remote communications nodes 108*a*-108*b* would parse the TLVs, activate DSSM mode in the hardware (e.g., tune the tuner, etc,), and then send a REG-ACK to indicate to the headend 102 that it may begin sending traffic downstream to the DSSM-capable remote communications nodes 108*a*-108*b* in DSSM mode.

The present invention provides several advantages. Since DSSM-capable remote communications nodes 108*a*-108*b* and non-DSSM-capable remote communications nodes 108*c*-108*d* may coexist in the same channel, communication system 100 improves network performance (especially, in the downstream). In addition, communication system 100 increases throughput on, for example, a single remote communications node 108 with minimal to no cost increase, provides excellent backwards compatibility, greater network efficiency due to stat muxing across two types of remote communications nodes 108, and a smooth migration path (e.g., no need to dedicate large amounts of bandwidth to a small number of DSSM-capable remote communications nodes 108*a*-108*b* while deployment is in progress). Communication system 100 also has a very low die area in comparison with conventional approaches. However, the present invention may require the die area for the digital part of the receiving DSSM-capable remote communications nodes 108*a*-108*b* to be quadrupled in size. The present invention also enables a single stream to be presented to the MAC and network layers, thereby removing problems of IP addressing, packet ordering, or the like.

2.3 Example System Implementation

FIGS. 1-25 are conceptual illustrations allowing an easy explanation of higher-layer bonding and lower-layer bonding. It should be understood that embodiments of the present invention could be implemented in hardware, firmware, software, or a combination thereof. In such an embodiment, the various components and steps would be implemented in hardware, firmware, and/or software to perform the functions of the present invention. That is, the same piece of hardware, firmware, or module of software could perform one or more of the illustrated blocks (i.e., components or steps).

In this document, the terms "computer program medium" and "computer usable medium" are used to generally refer to media such as a removable storage unit, a hard disk installed in hard disk drive, and signals (i.e., electronic, electromagnetic, optical, or other types of signals capable of being received by a communications interface). These computer program products are means for providing software to a computer system. The invention, in an embodiment, is directed to such computer program products.

In an embodiment where aspects of the present invention are implemented using software, the software may be stored in a computer program product and loaded into computer system using a removable storage drive, hard drive, or communications interface. The control logic (software), when executed by a processor, causes the processor to perform the functions of the invention as described herein.

In another embodiment, aspects of the present invention are implemented primarily in hardware using, for example, hardware components such as application specific integrated circuits (ASICs). Implementation of the hardware state machine so as to perform the functions described herein will be apparent to one skilled in the relevant art(s).

In yet another embodiment, the invention is implemented using a combination of both hardware and software.

While various embodiments of the present invention have been described above, it should be understood that they have been presented by way of example, and not limitation. It will be apparent to one skilled in the relevant art(s) that various changes in form and detail may be made therein without departing from the spirit and scope of the invention. Moreover, it should be understood that the method, system, and computer program product of the present invention could be implemented in any multi-nodal communications environment governed by centralized nodes. The nodes include, but are not limited to, cable modems, set-top boxes, and headends, as well as communication gateways, switches, routers, Internet access facilities, servers, personal computers, enhanced telephones, personal digital assistants (PDA), televisions, or the like. Thus, the present invention should not be limited by any of the above-described exemplary embodiments, but should be defined only in accordance with the following claims and their equivalents.

What is claimed is:

1. A system to transfer data, the system comprising:
a first node connected to a second node via multiple channels, the first node comprising:
a first edge modulator configured to transmit over a first group of channels in the multiple channels;
a second edge modulator configured to transmit over a second group of channels in the multiple channels; and
a forwarder configured to assign a portion of the data to the first edge modulator or the second edge modulator based on a combined load of the first group of channels and a combined load of the second group of channels.

2. The system of claim 1, wherein the portion of the data is a flow that defines a video or an image.

3. The system of claim 1, wherein the forwarder views the first group of channels as a single channel having a bandwidth equal to the sum of the bandwidths of the first group of channels.

4. The system of claim 1, wherein the forwarder is further configured to load balance flows in the data among the first edge modulator and the second edge modulator based on the combined load of the first group of channels and the combined load of the second group of channels.

5. The system of claim 1, wherein the forwarder is further configured to reassign a flow in the data from the first edge modulator to the second edge modulator based on congestion at the first edge modulator.

6. The system of claim 5, wherein the forwarder is further configured to wait a predetermined amount of time after a packet of the flow is transmitted to the first edge modulator before transmitting packets of the flow to the second edge modulator.

7. The system of claim 1, wherein the first edge modulator is configured to assign packets of a flow received from the forwarder among the first group of channels.

8. The system of claim 7, wherein the first edge modulator is further configured to assign the packets of the flow based on congestion associated with the first group of channels.

9. The system of claim 1, wherein the first node is part of a headend and the second node is a cable modem.

10. A method comprising:
determining, for a first edge modulator, a first combined load of channels associated with the first edge modulator;
determining, for a second edge modulator, a second combined load of channels associated with the second edge modulator;
assigning a flow to the first edge modulator based on the first combined load and the second combined load; and
assigning, for transmission, packets of the flow at the first edge modulator among the channels associated with the first edge modulator.

11. The method of claim 10, wherein the flow defines a video or an image.

12. The method of claim 10, wherein assigning the packets of the flow at the first edge modulator among the channels associated with the first edge modulator further comprises:
assigning the packets of the flow based on congestion associated with the channels of the first edge modulator.

13. The method of claim 10, further comprising:
reassigning the flow from the first edge modulator to the second edge modulator based on congestion at the first edge modulator.

14. The method of claim 13, wherein reassigning the flow further comprises:
waiting a predetermined amount of time after a packet of the flow is transmitted to the first edge modulator before transmitting packets of the flow to the second edge modulator.

15. An apparatus to transfer data, the apparatus comprising;
a first edge modulator configured to transmit over a first group of radio frequency (RF) channels connected to a cable modem;
a second edge modulator configured to transmit over a second group of RF channels connected to the cable modem; and
a forwarder configured to assign a portion of the data to the first edge modulator or the second edge modulator based on a combined load of the first group of RF channels and a combined load of the second group of RF channels.

16. The apparatus of claim 15, wherein the forwarder is further configured to load balance flows in the data among the first edge modulator and the second edge modulator based on the combined load of the first group of channels and the combined load of the second group of channels.

17. The apparatus of claim 15, wherein the forwarder is further configured to reassign a flow in the data from the first edge modulator to the second edge modulator based on congestion at the first edge modulator.

18. The apparatus of claim 17, wherein the forwarder is further configured to wait a predetermined amount of time after a packet of the flow is transmitted to the first edge modulator before transmitting packets of the flow to the second edge modulator.

19. The apparatus of claim 15, wherein the first edge modulator is configured to assign packets of a flow received from the forwarder among the first group of channels.

20. The apparatus of claim 19, wherein the first edge modulator is further configured to assign the packets of the flow based on congestion associated with the first group of channels.

* * * * *